(12) United States Patent
Estable et al.

(10) Patent No.: US 12,116,137 B2
(45) Date of Patent: Oct. 15, 2024

(54) AIR QUALITY IMPROVEMENT FOR PRESSURIZED AIRCRAFT

(71) Applicant: 4031202 CANADA INC., Gatineau (CA)

(72) Inventors: Luis Pablo Estable, Gatineau (CA); Cadieux Daniel, Gatineau (CA)

(73) Assignee: 4031202 CANADA INC., Gatineau (CA)

( * ) Notice: Subject to any disclaimer, the term of this patent is extended or adjusted under 35 U.S.C. 154(b) by 835 days.

(21) Appl. No.: 17/106,121

(22) Filed: Nov. 29, 2020

(65) Prior Publication Data

US 2021/0316868 A1 Oct. 14, 2021

Related U.S. Application Data

(63) Continuation of application No. PCT/CA2019/050766, filed on Jun. 3, 2019.

(Continued)

(51) Int. Cl.
*B64D 13/06* (2006.01)
*B08B 9/027* (2006.01)
(Continued)

(52) U.S. Cl.
CPC ............ *B64D 13/06* (2013.01); *B64D 13/04* (2013.01); *B64D 45/00* (2013.01); *B64F 5/30* (2017.01);
(Continued)

(58) Field of Classification Search
CPC ........ B64D 13/02; B64D 13/08; B64D 13/06; B64D 13/04; B64D 45/00; B64D 2013/0625; B64D 2013/06888; B64F 5/30; B08B 9/027; G01N 1/2247; G01N 33/0009; G01N 33/0004
(Continued)

(56) References Cited

U.S. PATENT DOCUMENTS 2,721,456 A 10/1955 Whitney, Jr. et al.
3,640,464 A 2/1972 Malczewski
(Continued)

FOREIGN PATENT DOCUMENTS

CA 2540948 9/2007
CN 2799193 7/2006
(Continued)

OTHER PUBLICATIONS

PCT search report and written opinion issued Aug. 16, 2019 for PCT patent application PCT/CA2019/050766 filed Jun. 3, 2019.
Automated translation of Chinese patent 105523185.

*Primary Examiner* — Edelmira Bosques
*Assistant Examiner* — Frances F. Hamilton

(57) ABSTRACT

Disclosed is a method including sampling the air of a pressurized zone of an aircraft by identifying a pre-existing pressurized air flow in a pressurized zone of an aircraft without substantially blocking the pre-existing pressurized air flow and creating a data record that can be used when cleaning the cabin air ducts using cleaning techniques suitable for cleaning the respective air duct elements using a sequence of cleaning acts suitable for cleaning select elements of the cabin air ducts. The data record includes identification information which can be used to report incidents to the relevant aviation authority.

16 Claims, 13 Drawing Sheets

Related U.S. Application Data

(60) Provisional application No. 62/679,595, filed on Jun. 1, 2018.

(51) Int. Cl.
*B64D 13/04* (2006.01)
*B64D 45/00* (2006.01)
*B64F 5/30* (2017.01)
*G01N 1/22* (2006.01)
*G07C 5/00* (2006.01)

(52) U.S. Cl.
CPC ......... *G01N 1/2226* (2013.01); *G01N 1/2247* (2013.01); *G07C 5/008* (2013.01); *B08B 9/027* (2013.01); *B64D 2013/0625* (2013.01); *B64D 2013/0688* (2013.01); *G01N 2001/2238* (2013.01)

(58) Field of Classification Search
USPC ......................................................... 454/71
See application file for complete search history.

(56) References Cited

U.S. PATENT DOCUMENTS

| | | |
|---|---|---|
| 3,905,191 A | 9/1975 | Matto |
| 4,391,017 A | 7/1983 | Bruensicke |
| 4,755,360 A | 7/1988 | Dickey et al. |
| 5,011,632 A | 4/1991 | Yano |
| 5,343,692 A | 9/1994 | Thomson et al. |
| 5,482,229 A | 1/1996 | Asshauer |
| 5,567,230 A | 10/1996 | Sinclair |
| 6,103,210 A | 8/2000 | Green |
| 8,894,925 B2 | 11/2014 | Parfitt et al. |
| 8,980,171 B2 | 3/2015 | Mazyck et al. |
| 2002/0137430 A1 | 9/2002 | Renault et al. |
| 2003/0008341 A1* | 1/2003 | Spurrell ............... G01N 1/2208 435/287.1 |
| 2003/0021721 A1 | 1/2003 | Hall |
| 2003/0024552 A1* | 2/2003 | Watanabe ................. F28G 9/00 134/102.1 |
| 2003/0039576 A1 | 2/2003 | Hall |
| 2004/0231089 A1* | 11/2004 | Vilarasau Alegre .... B08B 9/049 15/319 |
| 2005/0053515 A1* | 3/2005 | Yates ........................ A61L 9/16 422/4 |
| 2005/0074359 A1* | 4/2005 | Krieger ................... A61L 2/208 422/292 |
| 2005/0188773 A1* | 9/2005 | Fox .......................... G01N 1/22 73/863.83 |
| 2005/0191213 A1* | 9/2005 | Casillas ................... G01N 1/22 422/174 |
| 2006/0131161 A1 | 6/2006 | Towler |
| 2006/0225522 A1* | 10/2006 | Craig ..................... G01N 1/2202 73/863.01 |
| 2007/0053188 A1 | 3/2007 | New et al. |
| 2007/0068284 A1* | 3/2007 | Castro ................... G01N 1/2205 73/863.21 |
| 2007/0158499 A1* | 7/2007 | Whittingham ............ A61L 9/20 244/118.5 |
| 2008/0012310 A1* | 1/2008 | Weaver ................... F16L 55/32 285/288.1 |
| 2008/0163670 A1* | 7/2008 | Georgeson ............. G08B 31/00 73/23.31 |
| 2008/0202332 A1* | 8/2008 | Rowley .............. G01N 33/0047 96/108 |
| 2008/0281528 A1* | 11/2008 | Relle, Jr. ............... G01N 1/2273 702/50 |
| 2009/0311138 A1* | 12/2009 | Klaptchuk ........... B60H 3/0071 422/30 |
| 2011/0192170 A1* | 8/2011 | Dooley ..................... F02C 6/08 60/785 |
| 2014/0271347 A1* | 9/2014 | Park .......................... A61L 2/22 422/3 |
| 2015/0360786 A1 | 12/2015 | Oberpriller et al. |
| 2016/0016671 A1* | 1/2016 | Fournier ................ G07C 5/008 340/963 |
| 2016/0032761 A1 | 2/2016 | Griffits et al. |
| 2016/0271289 A1 | 9/2016 | Duffy |
| 2016/0305854 A1* | 10/2016 | Novaro ............. G01N 15/0606 |
| 2016/0375166 A1* | 12/2016 | Kreitenberg ............. A61L 2/24 422/24 |
| 2017/0089810 A1* | 3/2017 | Novaro ................ G01N 1/2247 |
| 2017/0160180 A1* | 6/2017 | Bezold ............... G01N 15/0656 |
| 2017/0253338 A1 | 9/2017 | Fantuzzi et al. |
| 2017/0290935 A1* | 10/2017 | Boodaghians ............ A47L 9/02 |
| 2018/0128802 A1* | 5/2018 | Al Azri ................ G01N 1/2273 |
| 2018/0214591 A1* | 8/2018 | Park .......................... B64F 5/30 |
| 2022/0155280 A1* | 5/2022 | Krenz ..................... B01L 3/021 |
| 2022/0409759 A1* | 12/2022 | Cummings ............. F16L 41/04 |

FOREIGN PATENT DOCUMENTS

| | | | |
|---|---|---|---|
| CN | 201067750 | 6/2008 | |
| CN | 102489481 | 6/2012 | |
| CN | 102896122 | 1/2013 | |
| CN | 204234416 | 4/2015 | |
| CN | 105523185 | 4/2016 | |
| CN | 106994298 | 8/2017 | |
| DE | 102008023895 | 12/2009 | |
| EP | 3296208 | 3/2018 | |
| FR | 2675406 | 10/1992 | |
| GB | 796349 | 6/1958 | |
| GB | 796527 | 6/1958 | |
| GB | 802698 | 10/1958 | |
| GB | 817975 | 8/1959 | |
| GB | 837166 | 6/1960 | |
| GB | 944931 | 12/1963 | |
| GB | 954477 | 4/1964 | |
| GB | 976564 | 11/1964 | |
| GB | 1157962 | 7/1969 | |
| GB | 1205767 | 9/1970 | |
| GB | 1432022 | 4/1976 | |
| GB | 2212370 | 7/1989 | |
| GB | 2341094 | 3/2000 | |
| GB | 2413377 | 10/2005 | |
| GB | 2435874 | 9/2007 | |
| GB | 2447042 A * | 9/2008 | ........... G01N 1/2273 |
| GB | 2448139 | 10/2008 | |
| GB | 2549192 | 10/2017 | |
| JP | H02179599 | 7/1990 | |
| JP | H03188980 | 8/1991 | |
| JP | H10303274 | 11/1998 | |
| JP | 2001071999 | 3/2001 | |
| JP | 2017206236 | 11/2017 | |
| KR | 20170124985 | 11/2017 | |
| RU | 2609594 | 2/2017 | |
| TW | 200422566 | 11/2004 | |
| WO | 9816263 | 4/1998 | |
| WO | 2004033044 | 4/2004 | |
| WO | 2004105808 | 12/2004 | |
| WO | 2005122669 | 12/2005 | |
| WO | 2014115161 | 7/2014 | |

* cited by examiner

AIR QUALITY IMPROVEMENT FOR PRESSURIZED AIRCRAFT

CROSS-REFERENCE TO RELATED APPLICATIONS

The present application is related to and claims convention priority from U.S. Provisional Patent Application No. 62/679,595, filed Jun. 1, 2018, for AIR QUALITY TEST FOR AIRCRAFTS, by Daniel Cadieux, included by reference herein.

The present application is related to and claims convention priority from Canadian Patent Application No. 3,007,589, filed Jun. 7, 2018, for AIR QUALITY PRESERVATION SYSTEM FOR PRESSURIZED AIRCRAFTS, by Daniel Cadieux, included by reference herein.

TECHNICAL FIELD

This application relates to aircraft air quality in general, and to an air quality improvement for pressurized aircrafts, in particular.

BACKGROUND OF THE INVENTION

On most airliners, the air necessary for life support at high altitude is bleeded from the engines pressurized and warmed in order to be usable through the Air System. On a pressurized aircraft, the vaporization of synthetic engine oil & additives in the ducting ventilation lines may result in persons being temporarily exposed (with an estimation of one event for 2000 flights) to the risk of breathing toxic gas which are considered by some medical experts to contain seriously harmful contaminants, such as for example TCP (Tri-Cresyl Phosphates) Organophosphates, which are known to be a neurotoxin and hazardous gases for human health. This contamination is a concern for passengers and especially for the flight crew for which the risk of repeated exposure over work shifts may result in safety of flight considerations, increased cost of medical care, and/or loss of jobs for the victims. This phenomenon, embedded for its consequences in the term "Fume event" in the aviation community, is called Aerotoxic Syndrome. Military personnel, flight crew and pilots may also suffer from further exposure to TCP and Organophosphates contained in jet engines turbine lubricants, the most popular being "jet Oil 2". The current contaminated oil has already been recognised as a cause for Aerotoxic Syndrome at the World health Organisation, and addressing it may help prevent epidemics on air traveling.

Even if various technologies may be used, such as filters, to stop the propagation of TCP in air ducts, neither equipments nor specific airworthiness regulations have been raised to address this particular topic. Three challenging issues are to: find the best means to prevent the occurrence of the Aerotoxic Syndrome on board of pressurized aircrafts; to improve the current quality of the air regarding also biological contaminants; and collect basic contamination data, which are dramatically missing.

There is evidence that air quality improvement procedures are working on commercial, industrial and hospital projects. The fact that the aircraft industry is lagging in adoption of air quality improvement procedures may be in part due to the complexity of aircraft and the fact that the industry is highly regulated so that only aircraft qualified maintenance personnel can access certain parts of the air ventilation system and they do not have any procedures specified to, for example, to clean the air ducts in an aircraft. Even though there are no air duct cleaning services yet available throughout the world, FAA, EASA, and more Agencies worldwide are looking for solutions.

Filters are only a recommendation and ducts have never been cleaned over the life span of an aircraft. There is clear logical, scientific and technical evidence that urgently show the risk that contamination by organophosphate due to fume events present, such that technology that mitigates this risk is to be considered as a priority. The presence of biological contaminants is a secondary concern but a significant improvement is also required.

SUMMARY

There is a long felt need for the improvement of air quality on board of all airliners as this may result in improved health for all of humanity given the forecast of significant growth of air traffic in the coming years.

It would be advantageous to provide a method that can be used for sampling the air of aircrafts.

It would also be advantageous to provide a method that can be used for providing a data record related to the air samples to make basic data regarding the air samples more broadly available.

It would further be advantageous to provide a method that can be used to clean the air ducts of aircraft having regard to the data record related to air samples of the aircraft to ensure that the appropriate techniques are used to improve the quality of air in all aircraft systematically.

According to one aspect of the present disclosure, there is provided a method including the steps of: sampling the air of a pressurized zone of an aircraft to produce a pressurized air sample; providing a data record that is related to the pressurized air sample; and cleaning the cabin air ducts of the aircraft while using the data record. In some embodiments, the sampling step comprises the acts of: identifying a pre-existing pressurized air flow in a pressurized zone of an aircraft suitable for sampling pressurized air; providing an air sampling housing having an inlet port, an outlet port, and a sampling region therebetween, the sampling region in fluid communicating with the inlet port and the outlet port; interfacing the air sampling housing with either a pre-existing source or a pre-existing sink of the pre-existing pressurized air flow so a portion of the pre-existing pressurized air flow enters the inlet port, flows through the sampling region, and exits the outlet port; and providing an air sampling device in the sampling region of the air sampling housing so that a portion of the pre-existing pressurized air flow that flows through the sampling region can be sampled by the sampling device without substantially blocking the pre-existing pressurized air flow. In some embodiments, the act of cleaning the cabin air ducts further comprises the acts of: determining a point of access to the cabin air ducts of the aircraft; determining a map of the cabin air ducts of the aircraft; determining a network of connected air duct elements of the map of cabin air ducts; determining a collection of cleaning techniques suitable for cleaning the respective air duct elements of the determined network of connected air duct elements of the map of cabin air ducts; and determining a sequence of cleaning acts, each cleaning act including the act of applying a select cleaning technique selected from the determined collection of cleaning techniques suitable for cleaning a respective select element selected from the determined network of connected elements of the map of cabin air ducts. In some embodiments, the data record includes identification information which can be used to report incidents to the relevant aviation authority.

Other aspects and features of the present disclosure will become apparent to those ordinarily skilled in the art upon review of the following description of specific embodiments of a air quality improvement for pressurized aircraft in conjunction with the accompanying drawing figures.

BRIEF DESCRIPTION OF THE DRAWINGS

Embodiments of the present disclosure will now be described, by way of example only, with reference to the accompanying drawing figures, wherein.

Like reference numerals are used in different figures to denote similar elements.

DETAILED DESCRIPTION OF THE DRAWINGS

The following terms may be used in this disclosure and have the meaning assigned to them: AAFS (American Academy of Forensic Sciences), CAA (Civil Aviation Association); FAA (Federal Aviation Administration); HCN (Hydrogen Cyanide); HEPA (High Efficiency Particulate Air); SOFT (Society of Forensic Toxicologist); TCP (Tricresyl Phosphate); TSB (Transportation Safety Board of Canada); DOT (Department of Transport); and ICAO (International Civil Aviation Organization).

Broadly, disclosed herein are three techniques, each of which is an improvement, and when combined provide air quality improvement for pressurized aircrafts. First a technique for sampling the air of aircrafts is disclosed which can be carried out by maintenance personnel, aircraft crew, as well as passengers. Second a technique for providing a data record related to the air samples is disclosed and enables the collection of basic data regarding the air samples to be more broadly available. Third a technique for cleaning the air ducts of aircraft is disclosed, having regard to the data record related to air samples of the aircraft, thereby ensuring that the appropriate techniques are used to improve the quality of air in all aircraft systematically. The combination of all three techniques, if practiced systematically can result in air quality improvement for pressurized aircrafts.

An approach taken in the present disclosure is to provide a systematic method for applying know and proven technologies that have never yet been used in high temperature closed system flexible vents of aircraft, and to create a digital record which can be used to improve overall aircraft air quality for the entire industry.

In so doing, improvements to many of the proven technologies are disclosed. For example, a duct crawler having an integrated, camera, lights, air flow compensator, propane or electrical heating unit, variable ducting tracks, in line flexible UV lights, cleaning agent and fogging dispenser, rotating electrical heated deep clean spin brushes, vacuum suction integrated system, is disclosed herein and is an improvement to existing duct crawling technology.

Some improvements disclosed herein are in ways of working with existing technologies. For example, a step by step combined cleaning process is disclosed that can be applied to existing and new technologies alike, and is an improvement that is applicable to existing aircraft models and types, as well was as different aircrafts model and types that have yet to be made.

Figure 1:
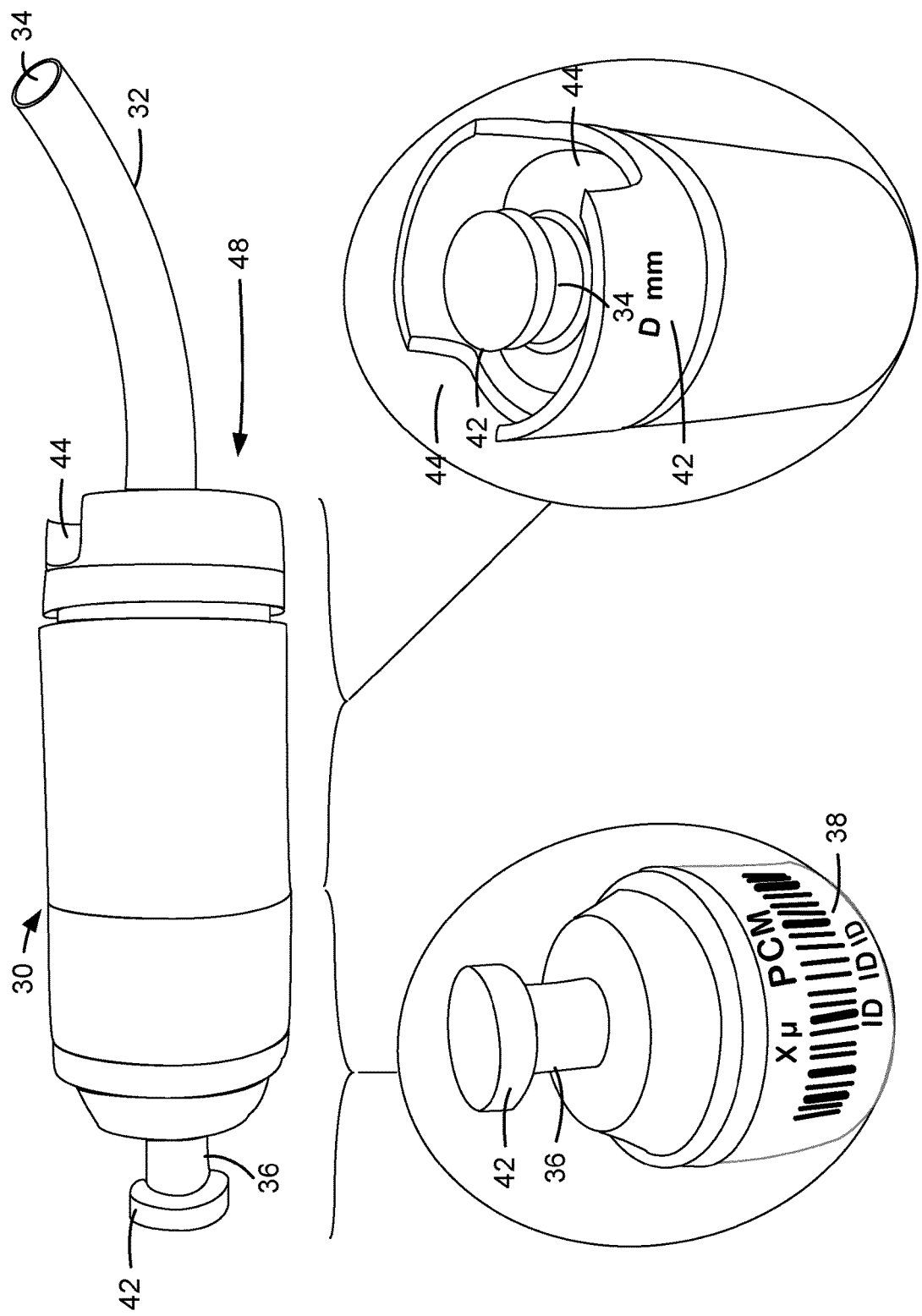
FIG. 1 shows an air sampling housing.
Figure 2:
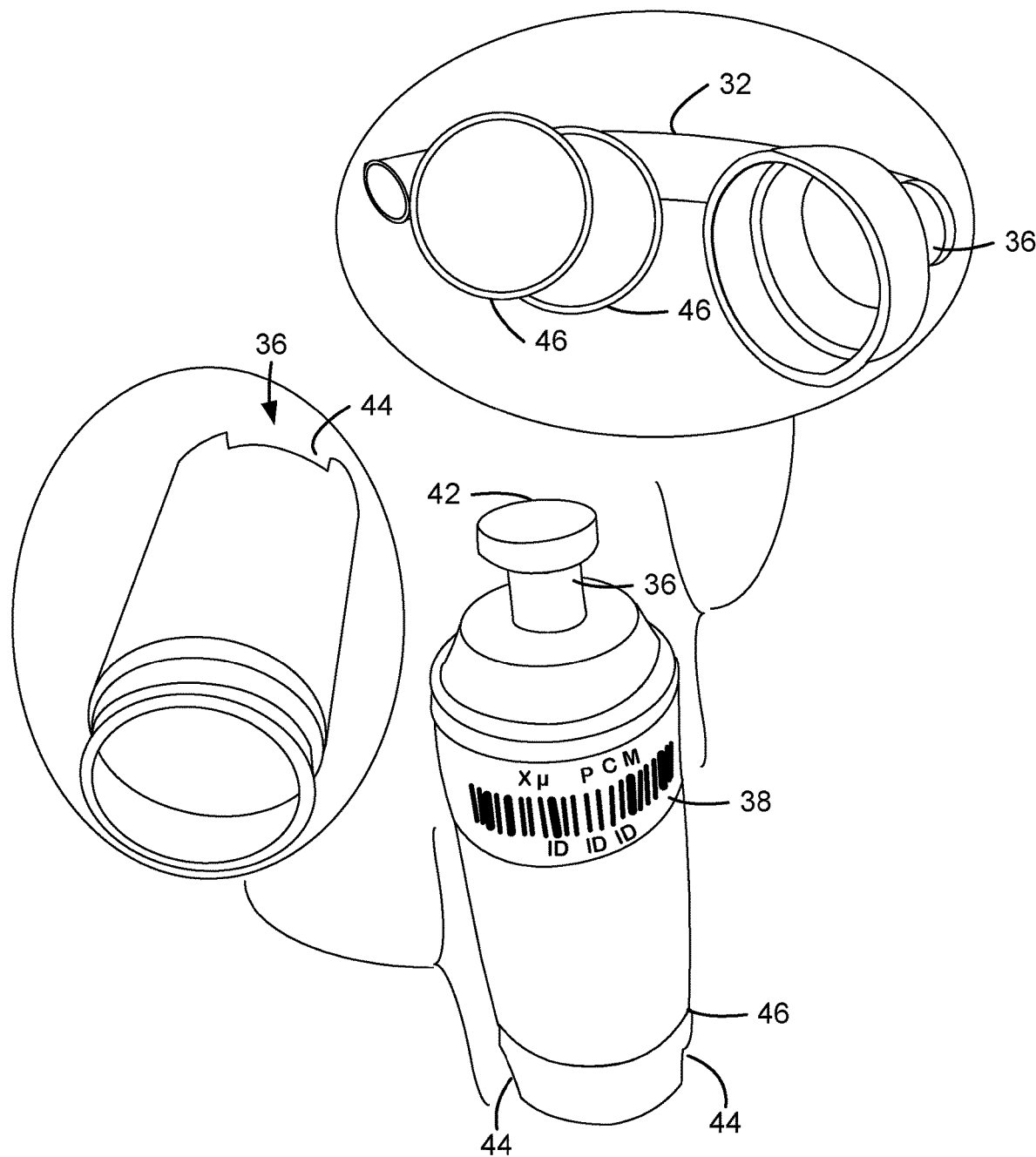
FIG. 2 shows the inside of air sampling housing of FIG. 1.

Referring to the drawings, FIG. 1 shows an air sampling housing 48. FIG. 2 shows the opened air sampling housing 48 of FIG. 1 to show the interior and the media that goes into it. The example air sampling housing 48 is an improvement on a standard air sampling cassette that is typically used by attaching it to a 120 Volt/60 hz pump, or battery operated pump, with a ¼" plastic flexible pipe 32 so that air flows through an inlet port 34 at the top, inside the air sampling cassette, and out the outlet port 36 at the bottom of the air sampling cassette. As illustrated, as with a standard air sampling cassette, the inlet port 34 and outlet port 36 each have a stopper 42 to avoid contaminating the media before sampling, and to avoid contaminating the sample after sampling. As with a standard air sampling cassette, the air sampling housing 48 contains an air sampling device 30, such as media, to sample air as it flows from the inlet port 34, through the air sampling device 30, to the outlet port 36. As with a standard air sampling cassette, the outside of the air sampling housing 48 carries an identification label 38 indicating the size of the sampling media 46 as well as a unique identifier for the air sampling device 30, for example a PCM 0.8 micron Mixed Cellulose Ester (MCE) filter, as would typically be done with an air sampling cassette. Although one could try to use an air sampling cassette with a pump to sample air in an aircraft, electricity is at a premium, and security and regulations are very stringent when it comes to bringing electro-mechanical devices to be operated in flight, such that using a standard air sampling cassette and pump may not be an acceptable solution for sampling air quality in an aircraft. The air sampling housing 48 improves over a standard air sampling cassette to overcome the constraints of being in a pressurized aircraft. First, there is no need for a pump, as will be further illustrated in reference to FIG. 3. Second, a fluid opening 44 is provided in the air sampling housing 48, in this case near the inlet port 34.

Figure 3:
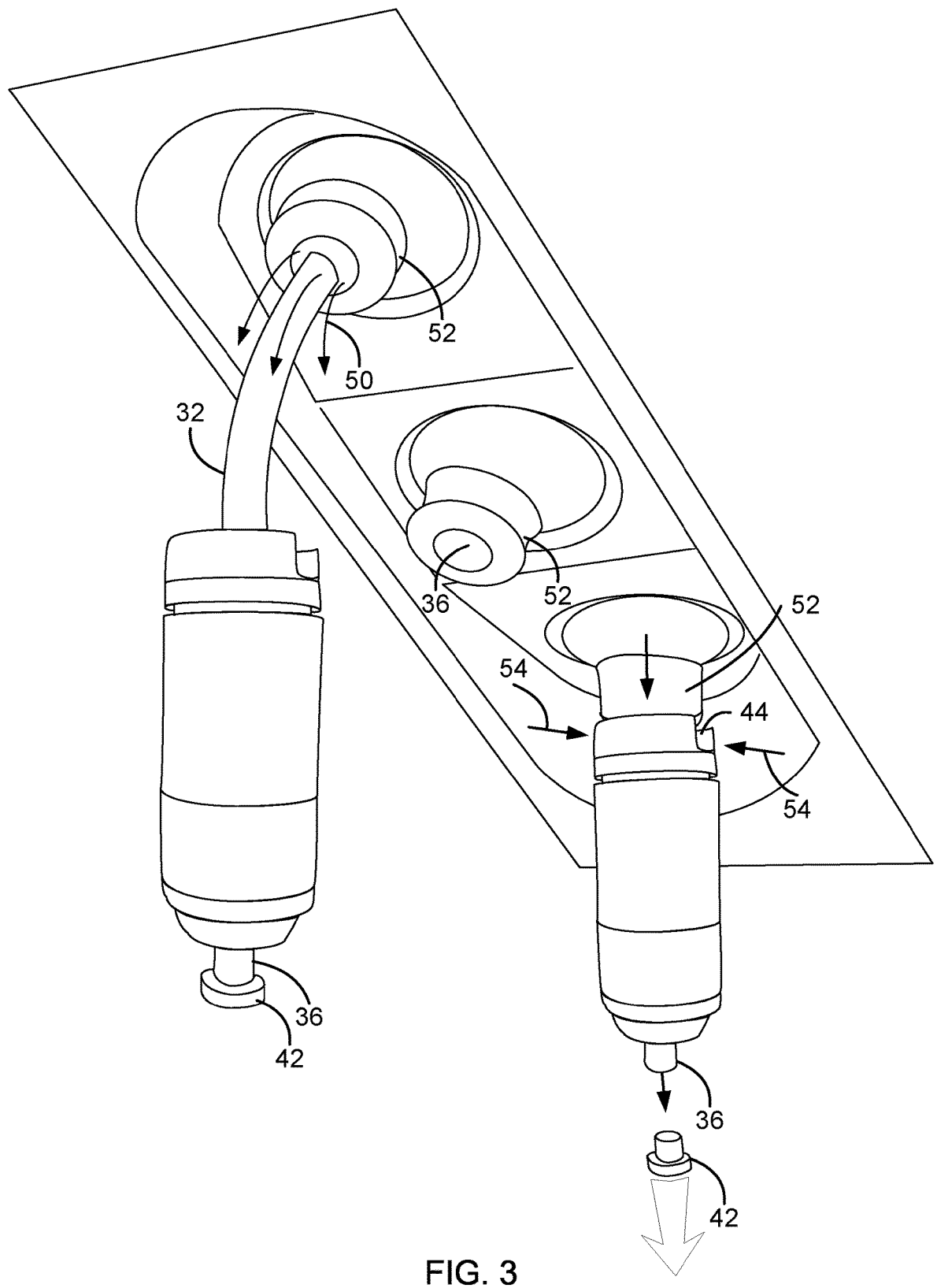
FIG. 3 shows three standard airliner overhead vents, two of which are interfacing with air sampling housings.

Referring to FIG. 3, three standard airliner overhead vents are shown. The middle vent is shown as a reference, and the two side vents are shown interfacing with two air sampling housing 48 of FIGS. 1-2. The top most vent shows an air sampling housing 48 with a pipe 32 attached to its inlet port 34 and a stopper 42 attached to its outlet port 36. The pipe 32 is inserted into the control nozzle of the pre-existing source 52 of pre-existing air flow 50, the vent. As illustrated, the pre-existing air flow 50 does not yet flow through the air sampling housing 48 because of the action of the stopper 42.

Figure 4:
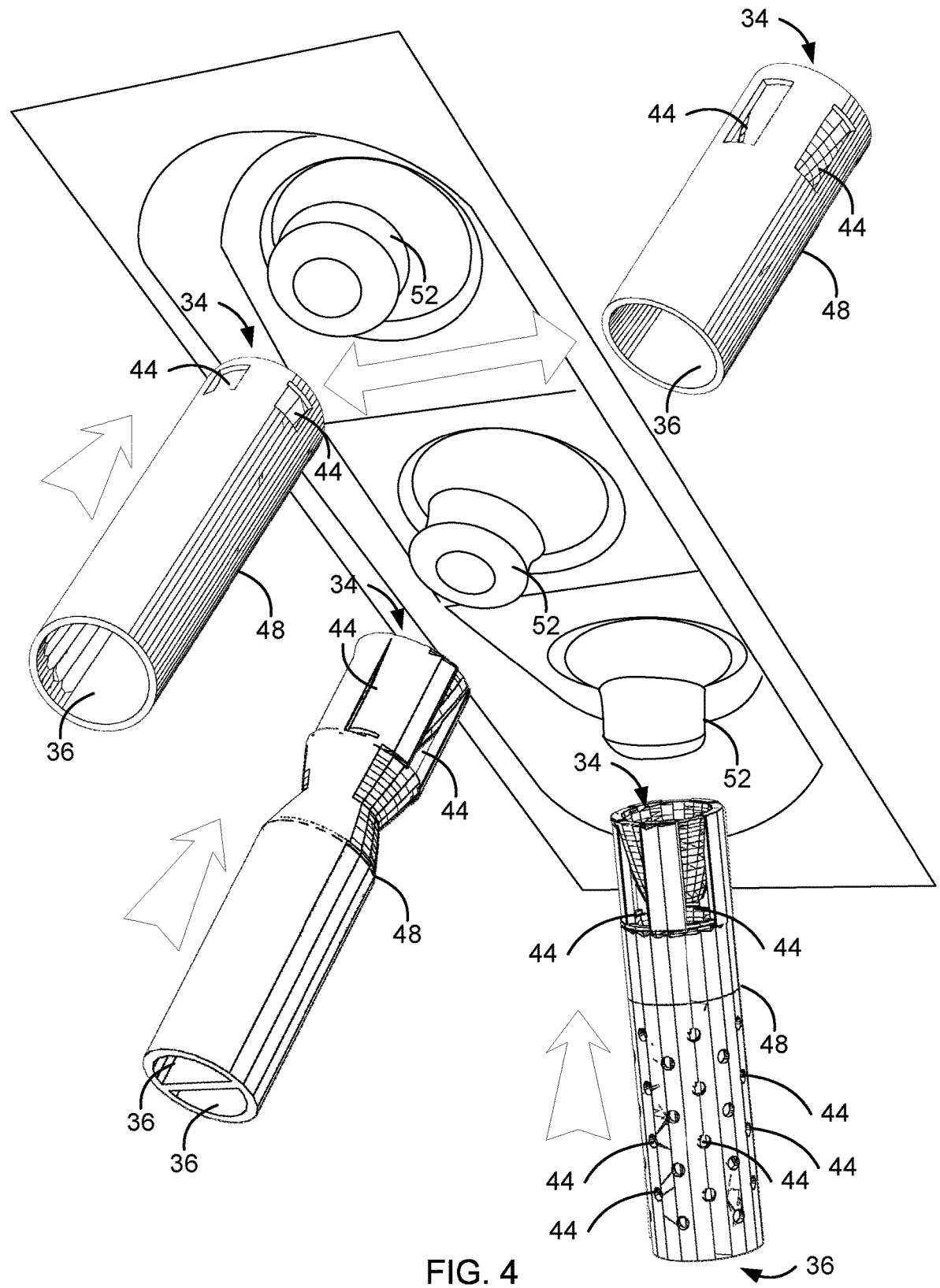
FIG. 4 shows four embodiments of an improved air sampling housing.
Figure 5:
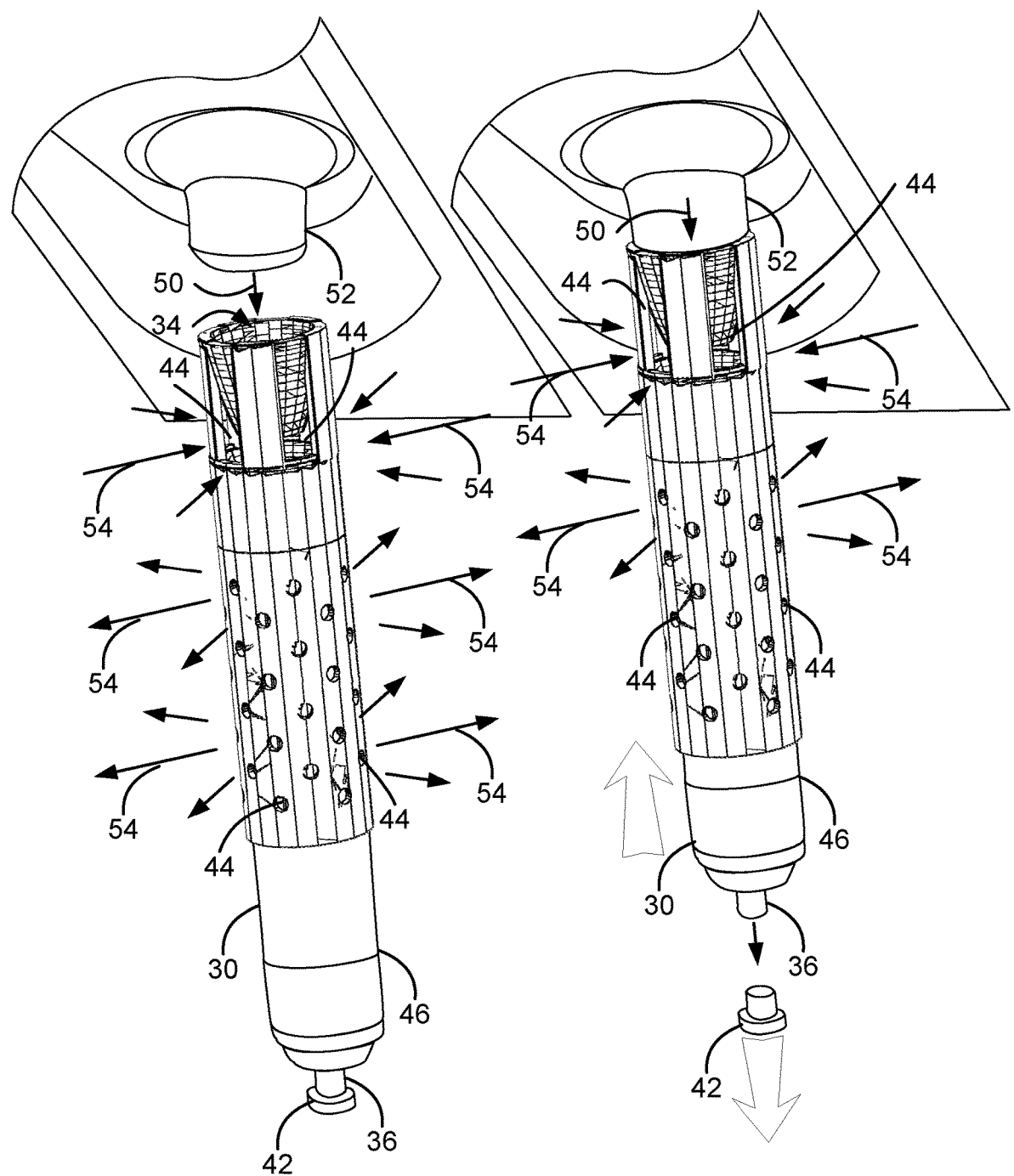
FIG. 5 shows an air sampling housing of FIG. 4.

When the stopper 42 is removed, the pre-existing air flow 50 would flow into the inlet port 34 passing through the air sampling device 30 and sampling media 46 and out the outlet port 36 into the cabin. Advantageously, with or without the stopper 42 in place, the pre-existing air flow 50 is not substantially blocked. Although not expressly shown, any number of removable fasteners could be used to attach the air sampling housing 48 to the vent, such as for example an elastic band, or by adapting the interface diameter 40 of the air sampling housing 48 for frictional engagement with the vent. Further improvements to the air sampling housing 48, including with respect to interfacing, are shown in FIGS. 4-5. By pushing the sampling housing right up against the nozzle, the pipe 32 need not be used at all. In the case of the second air sampling housing 48 attached to the bottom most vent, the pipe 32 has been removed and the air sampling device 30 interfaces directly with the source of the pre-existing air flow 50, the vent. Furthermore, each fluid opening 44 creates a new air flow 54 for sampling neighbouring air by using a pre-existing air flow 50 to entrain neighbouring air to form the new air flow 54 in an aircraft. Thus, advantageously, the air sampling housing 48 can be used without the need of an air pump to sample air in an aircraft by identifying a suitable source or sink of pressurized air flow in an aircraft pressurized zone, such as cabin, cockpit, or cargo hold for example, interfacing with it, and optionally using fluid openings to create a new air flow 54. Instead of using a pump that normally requires electricity which is at a premium in an aircraft, air samples can be taken at the various pre-existing source 52 (a gasper vent, personal comfort vent, control nozzle vent) of pre-existing air flow 50 putting air into pressurized zones of airliners or sinks of pre-existing air flow 50 taking pressurized air flow out of pressurized zones of airliners, and in their neighbourhood, despite the many different sizes of vents, louvers, and ports in an aircraft, by appropriate interfacing of an air sampling housing 48. Further advantageously, since the air sampling housing 48 includes an identification label 38 with a unique identifier, the sampling operation can be related to a data record of information including location, time, date, and duration of the sampling, and other information that can be used to improve air quality for pressurized aircraft, as will be detailed further below.

FIG. 4 shows four embodiments of an improved air sampling housing 48 configured to interface with the control nozzle of the airline gasper shown in FIG. 3. All of the air sampling housing 48 shown in FIG. 4 have the same diameter inlet port 34 that is configured to interface by frictional engagement with the control nozzles of the airline gaspers shown. The two topmost air sampling housing 48 differ in overall length, as well as the dimension of their fluid opening 44. The entrainment of the neighbouring air in all of the examples shown is improved by use of a funnel shaped inlet port 34 which increases entrainment of neighbouring air by increasing the air flow. This funnel like shape is repeated, and then reversed in the air sensing housing that is lined up with the centre gasper, to further increase air flow and entrainment, and then reduce it after the pre-existing air flow 50 is mixed with the new air flow 54. The outlet ports of all of the air sampling housing 48 are substantially the same between the top and bottom air sampling housings, whereas the one in the middle has a split chamber. This could be used, for example, to split the pre-existing air flow 50 into two, the first going through without any mixing with a new air flow 54 as a control, and the second mixed with the new air flow 54, with either separate sampling device, or by use of a split media in a single sampling device. The bottom air sampling housing 48 is similar to the top air sampling housing 48 except that its fluid opening 44 near the inlet port 34 is much larger, and there are provided a plurality of fluid opening 44 in the lower portion of the air sensing housing that affect the creation of new air flow 54, as will be described in greater detail with reference to FIG. 5.

FIG. 5 shows the bottom most air sampling housing 48 of FIG. 4 interfacing with an airline gasper at its inlet port 34, and with the air sampling cassette at the outlet port 36. The air sampling cassette has been selected with an interface diameter 40 that when inserted into the outlet port 36 of the air sampling housing 48 is engaged frictionally. On the left, even thought the air sampling housing 48 is not touching the gasper, it still is said to interface with it since the pre-existing air flow 50 is sufficient to be used for sampling, e.g. if the stopper 42 shown at the outlet port 36 of the air sampling cassette is removed, air would flow through the air sampling cassette and the air sampling media 46 therein. As illustrated, the pre-existing air flow 50 causes a new air flow 54 to enter via the fluid opening 44 near the inlet port 34 and exit via the plurality of fluid opening 44 near the outlet port 36. If the stopper 42 on the outlet port 36 were to be removed, air would flow out of the outlet port 36. On the right, the air sampling housing 48 is frictionally engaged with the gasper at the inlet port 34, and frictionally engaged with the air sampling cassette at the outlet port 36. Compared to the left, the sampling cassette is higher up and advantageously can be used to cover a portion of the plurality of fluid opening 44 in the air sampling housing 48 thereby providing a way of adjusting the new air flow 54. As was the case with the one on the left, the air sampling housing 48 does not block the pre existing air flow, while advantageously providing a new air flow 54 whose rate can be adjusted for sampling using standard air sampling cassette without the use of a pump or electricity. Thus, the fluid openings may be provided for several reasons, for example: to increase flow rate; to decrease flow rate; to sample larger or different region; to ensure that in case airflow to a sampling media is blocked it does not block the pre-existing air flow, to name a few.

Although the examples used so for an air sampling device have been air sampling media and cassettes, it is contemplated that other devices can be used such as manual, automatic, or semi-automatic gas pumps with sorbent tubes, glass tubes, paper or material colour reactive chemical tests (analogous to a litmus test), sensors for real time signal, etc. For example, the use of a UV light at a variable frequency can cause jet oils to fluoresce, which in turn can be detected with a photo diode tuned to the frequency range of the fluorescence. Thus, any form of sampling air can be used with the techniques of the present application either with a pre-existing air flow, and/or a data record related to the air sample.

Figure 6:
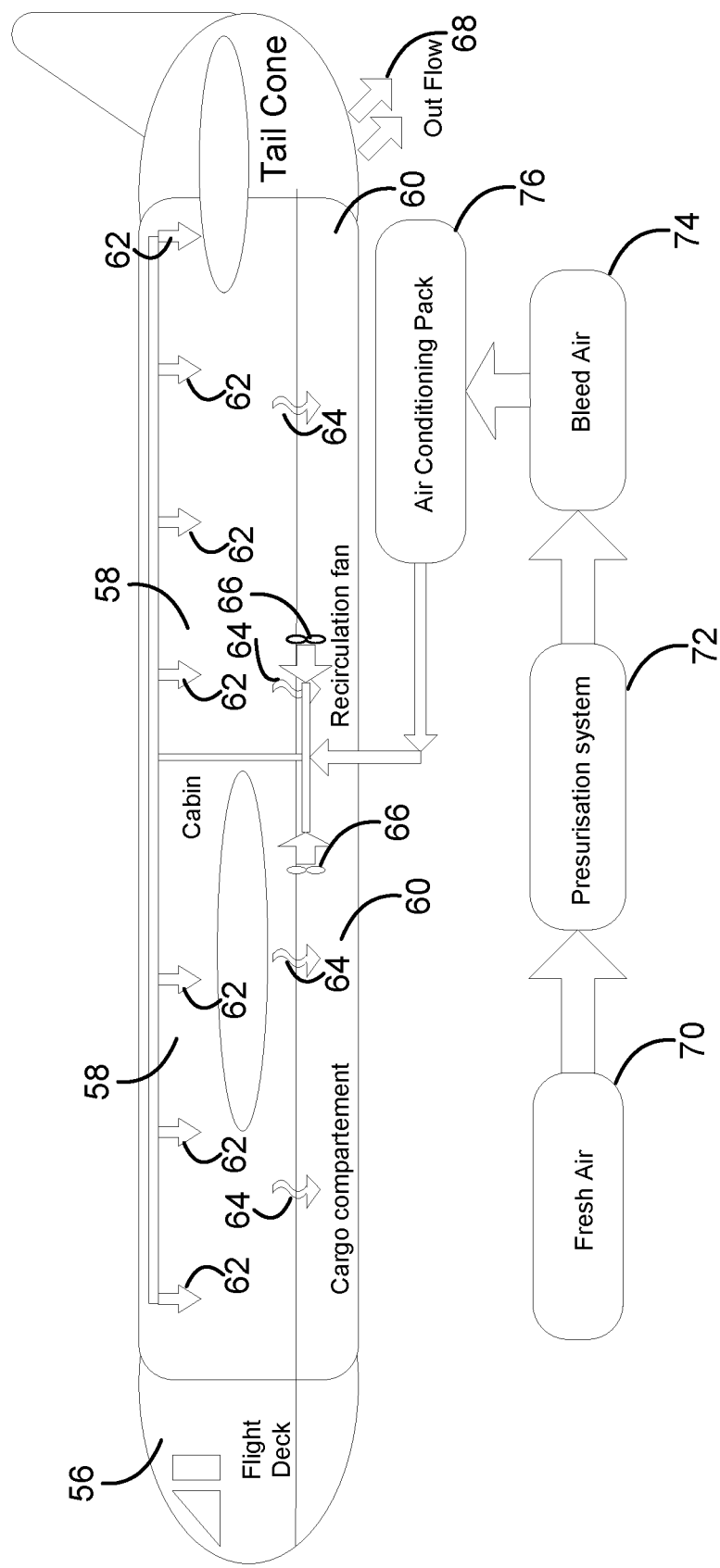
FIG. 6 shows a schematic view of the pressurized zones of an example aircraft.

FIG. 6 shows a schematic view of the pressurized zones of an example aircraft. The aircraft includes pressurized zones such as the pressurized flight deck 56, pressurized cabin 58, and pressurized cargo compartment 60. The tail cone as illustrated is not pressurized, as is often the case with airliners. Also shown are how, for example, fresh air 70 is processed by a pressurization system 72 to be mixed with bleed air at a bleed air system 74 that is used by the air conditioning pack 76 to pressurize the pressurized zones. Although we have illustrated the case where a gasper is used as a source of pre-existing air, a person of ordinary skill in the relevant field of art is enabled to adapting what is taught in this specification to a given aircraft. For example, with regards to interfacing an air sampling housing 48, to different sources of pre-existing air flow 50, such as for example, the louvers or ceiling vent 62 at the top of the cabin, or other vents in cabins that do not have gaspers. Similarly, it is contemplated that instead of interfacing the inlet port 34 of the air sensing housing with a source of pre-existing air flow 50, the outlet port 36 of the air sensing housing can be interfaced with a sink of a pre-existing air flow 50. For example, the outlet port of the air sensing housing can interface with the air return floor vent 64 usually found near the floor of the cabin, or the recirculation fan 66 usually found in the pressurized cargo compartment 60, at the air filter, or at or near an outflow valve 68 that are normally found in the pressurized cargo compartment, or any suitable source or sink of pre-existing air flow 50 in a pressurized zone of an aircraft. Similarly, it is contemplated that any change in geometry from circular, to square, to rectangular or otherwise to accommodate variations of pre-existing sources or sinks of pressurized air is within the scope of the present disclosure.

Figure 7:
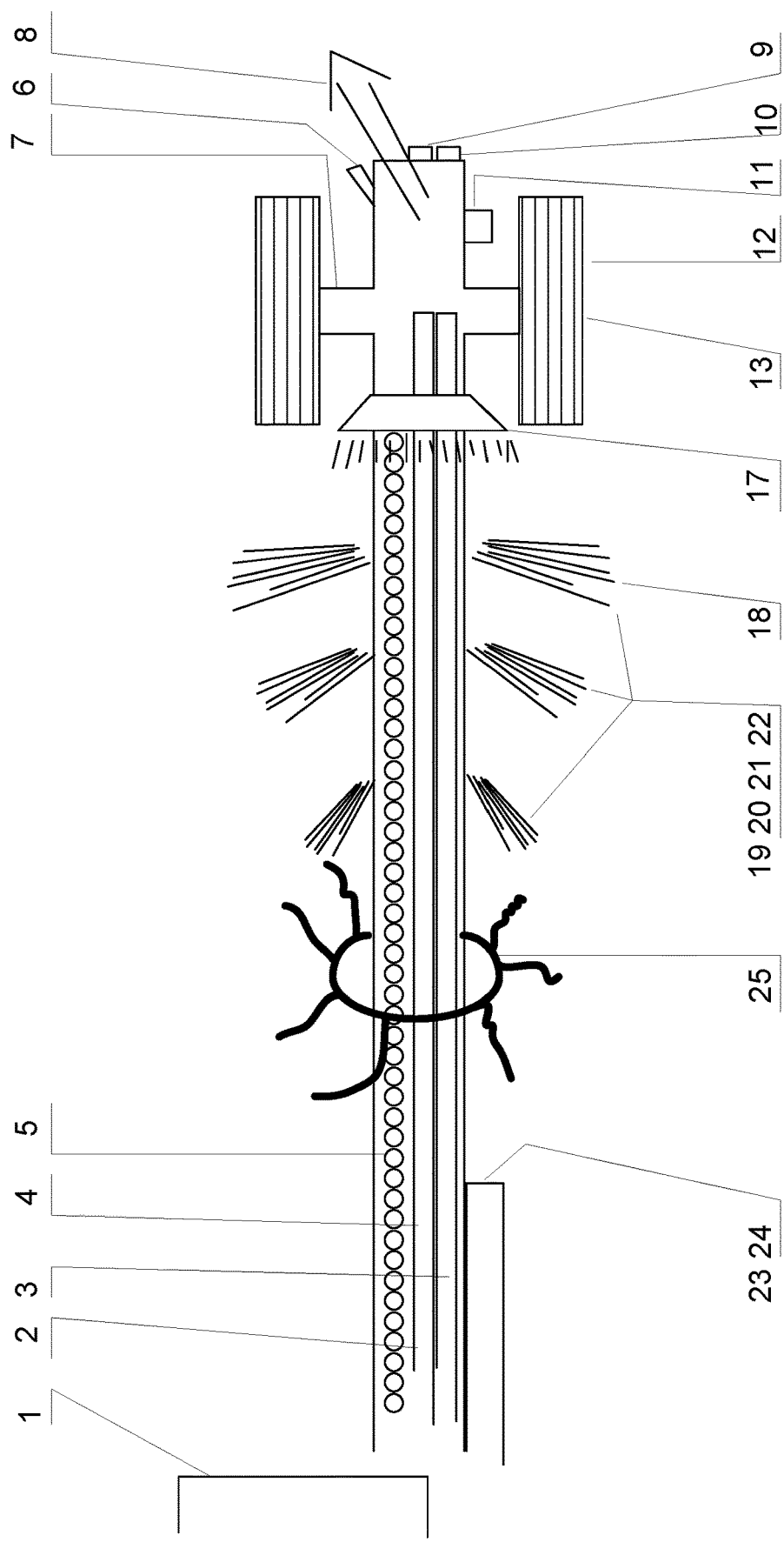
FIG. 7 shows a schematic view of an improved air duct cleaning device.
Figure 8:
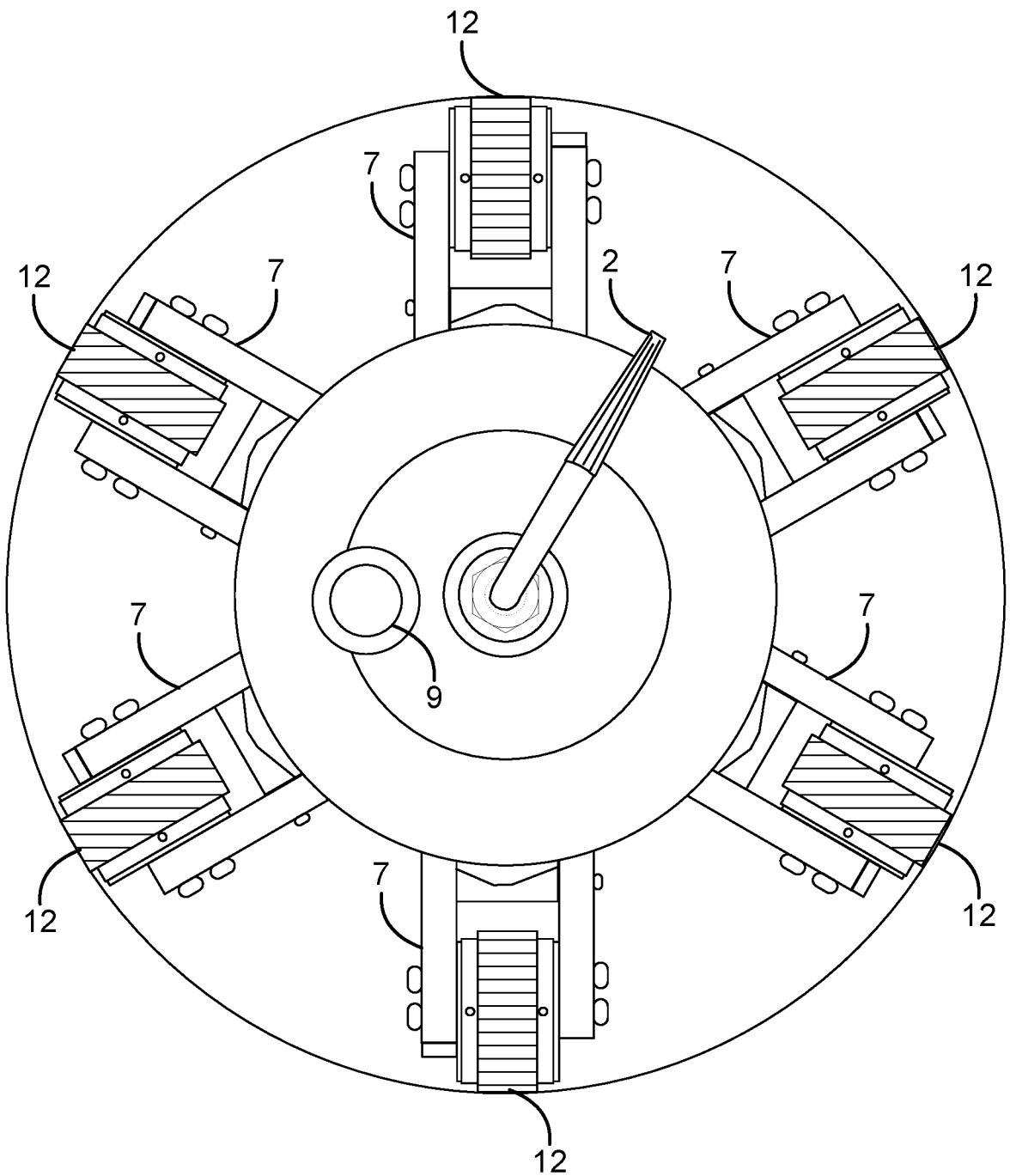
FIG. 8 shows a front view of an air duct cleaning device.

FIG. 7 shows a schematic view of an improved air duct cleaning device. FIG. 8 shows a front view indicating some standard features of a stripped down embodiment of the improved air duct cleaning device of FIG. 7. The device is specialized for aviation aircraft duct cleaning. As illustrated, numbered items in FIG. 5 include vacuum unit 1: a High Powered high CFM suction Type Vacuum with Adaptable UV lamps integrated, HEPA and or ULPA (Ultra Low Particulate Air" filters. Adaptable chamber will be used on this receptacle for different type contaminants in all different forms, liquid, solid, vapours and air collectibles; cleaning dispenser unit 2: Cleaning agent dispenser, used as perforated in line or as spray nozzles; fogging dispenser unit 3: fogging dispenser used for distribution of vaporised distribution of cleaning agent and or decontaminant fog; (4) UV lamps unit 4: in line UV Lamps, flexible or sequence mini units in line for UV closed space bacterial decontamination. UV rays to be either in line, or in wrap around shape to have more surfaces to be visible and to control decontamination type, evenly and time of exposure; (5) UV frequency unit 5: UV lamps are variable in frequencies to adapt to different type ducting material composite and for exposure to elements and radiation levels and time of exposure; air valve unit 6: air-gas balancing air for proper combustion, air valve unit 6 to control the proper percentage of air-gas mixture in a closed system to stay within LEL "Lower Explosive Limit"; duct adaptation 7 unit: self propelled track system adaptable to various size 4" to 24" (or smaller, or larger) ducting and track to various types of ducting materials; burner unit 8: propane burning unit with pilot assembly for high temperature deep cleaning warm up, to activate chemical used for cleaning or decontamination and for burning residual cleaning agents used in different procedure types; camera unit 9: camera with day and night capacity for video, picture, sound and recording for future reference; lights unit 10: LED lights to improve visibility; air compensator unit 11: negative air or vacuum air compensator for air push back unit 17, low pressure prevention for closed circuit systems; tracks unit 12: variable sized track systems, fire or non-fire resistant, interchangeable slide on track systems for vertical and horizontal climbs and stick on suction material for climb; sensors unit 13: sensor I for duct with, this unit will send with information to bushing devises for adapting to various with automatically and to report to Device operation; sensor II to detect various changes in ducting wall types and for prevention of bleed air exposure to passengers due to faulty or old systems (operator will report to mechanic and recommend sections to be changed if needed); sensor III, material type or contamination detection device to report to system operator; sensor IV, to be determined by operation controls, but for example can be a photo diode sensitive to light at a given frequency to detect the fluorescence of a material that has been lit by the UV lamps unit 4 at a frequency determined by the UV frequency unit 5; push back unit 17: ultra high pressure push back air, liquid or vapour form for push back system. Push back device can also be used to propel unit on all Axis with directional control by operator or AI (Artificial Intelligence) controls; rotating brushes unit 18: rotating brushes system, powered either on magnetic field around control line or by direct shaft system; retractable brushes unit 19: retractable brushes, brushes from different sizes, e.g. 4" to 24" (or smaller or larger), fold on themselves and open up in series controlled either directly via with sensors unit 13 sensor I or directly by operator; brush type unit 20: brushes type, different brush type will be interchangeable for different uses and cleaning or decontamination type; heated brushes unit 21: brushes material type is in various sizes and can be electrically charged for heating different ducting wall type to improve cleaning efficiency; brush material unit 22: brushes material type can be in various shapes and size and be electrically charged to induce magnetic field and static to trap different types of contaminants; suction unit 23: suction type system, will be flexible in line suction to return to main collective system; separation of contamination unit 24: separation of contamination, might be used with or without use of suction unit 23 by either electromagnetic, non-thermal plasma, or different collection type systems; whip unit 25: air duct whipping system I, in line will be a type wiping system to physically touch interior walls of conduits with holes in the wiping branches; air duct whipping system II, will be charged by either high pressure air, liquid (such as liquid nitrogen), vapours (such as activated oxygen) or solids (such as dry ice or micro sponges);air duct whipping system III, will also be used for heavy decontamination using solids type abrasive similar to sand blasting (such as dry ice or micro sponges); and air duct whipping system IV will be easily changeable for different uses in different conditions and for different purposes. Such heads might be either changed prior to work being completed or could be in variable sizes and types and controlled wither by sensor or by unit operator while work is being performed.

Different types of materials like plastic and metal alloy might be used for exposure to heat, cancer types, biological elements, absence or presence of air, absence or presence of solid, liquid, vapour and or air. It is anticipated that once the difficult conditions of aircraft have been met, some embodiments can be used for land, air and water cleaning procedures, some embodiments to be used for the removal of particles, dust, decontamination, biological, radiation, flooding, some embodiments to be used in different earth, water, air and different transportations, some embodiments can be produced in different sizes to clean 4" (or smaller or larger) air ducting soft or hard and more, some embodiments to be produced in different sizes to perform cleaning, decontamination or removal of all types of solid, liquid, vapour or air in various conditions. For example 4" Air ducts, 20" mining tunnels, (or smaller or larger) etc. . . . Some embodiments to be produced can be powered and controlled by operator or by different controlling systems including non-human controlled systems or artificial intelligent unit directly on or off the units control head. Some embodiments can be for many usages and can be used in a closed system and left in that system for all purpose cleaning types. For example a unit can be built in a closed system "Industrial Plant" type facility and can perform cleaning when manufacturing in process and debris can be collected by trapped systems in one of the loop phases or built in aircraft and left in for pilot to start system while in flight because of a bleed air malfunction causing TCP or Organophosphorus in cabin air. Different materials removed will be treated differently according to source of contaminants and will be disposed of in accordance to local law or stored in storage facility for further Analysis and testing of contaminants for future references of cause of the failure for a fixed predetermined period of, for example a minimum 15 years, or whatever required by applicable regulation. The analysis could be in real time, or delayed (days or months later), enabling the air sample and data record to act as an air quality black box. Analysis may involve comparing air quality information to a threshold for an air quality parameter (e.g. toxicity threshold). A signal could be raised, or an incident report form could be initiated, if a threshold is exceeded. Communicating that a threshold has been exceeded is an advantage that using a data record related to the air sample enables. The data record can then be sent to the FAA or other relevant authority. Crew may follow procedures necessary to prevent it does not occur again. Data record could be used for audit and compliance testing. Data records can be used to determine suspected sources of fume event, such as electrical wiring vs. bleed air, for example. If a fume event is detected, then service can be scheduled, for example servicing the seals of the engine are an example of service, engine service, or other service can be scheduled at the same time such as cleaning the air ducts of the aircraft.

Figure 9:
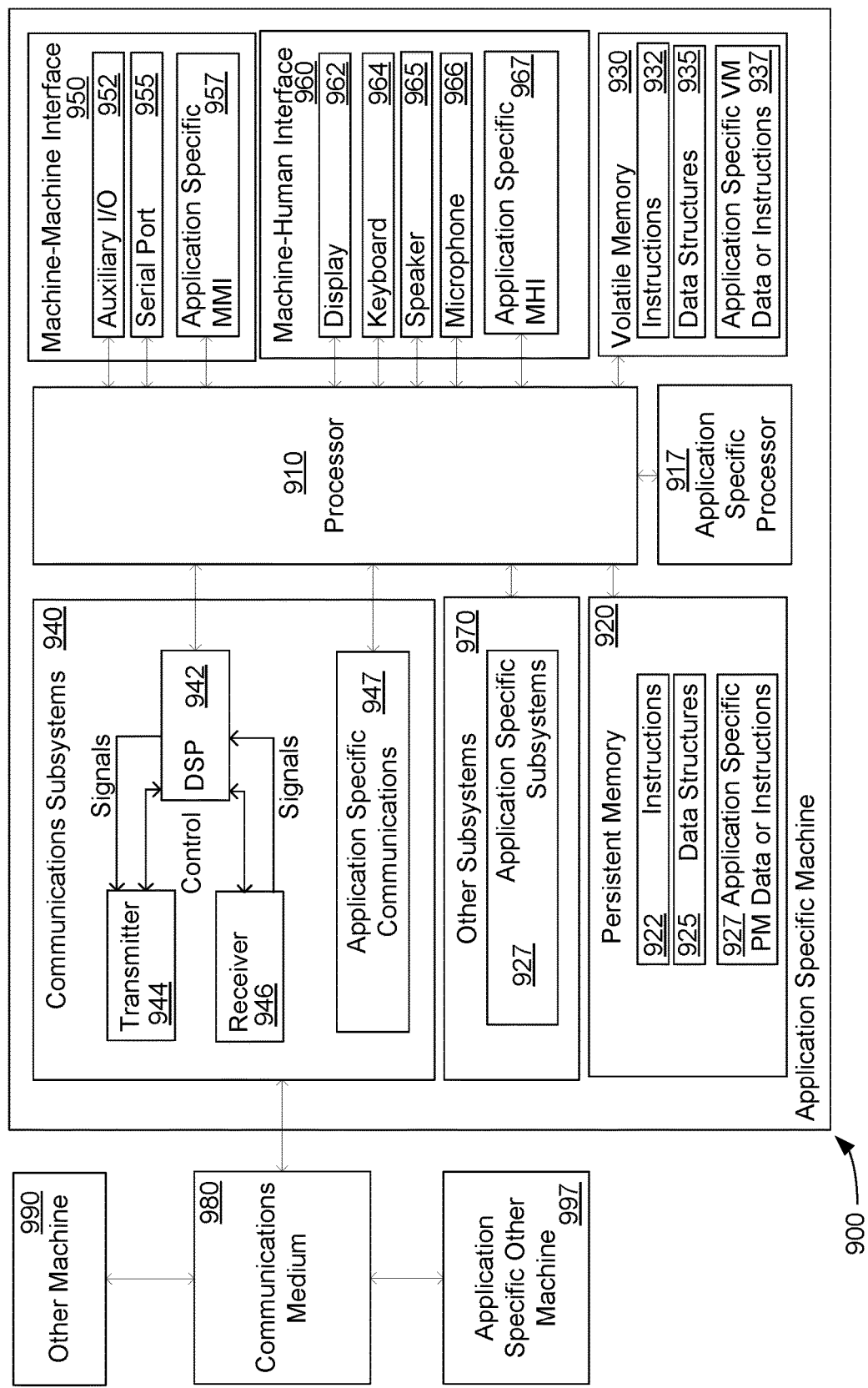
FIG. 9 is a block diagram of an exemplary application specific machine environment that can be used with embodiments of the present application.

Reference is now made to FIG. 9. FIG. 9 is a block diagram of an exemplary application specific machine environment that can be used with embodiments of the present application. Application Specific Machine 900 is preferably a two-way wireless or wired communication machine having at least data communication capabilities, as well as other capabilities, such as for example audio, and video capabilities. Application Specific Machine 900 preferably has the capability to communicate with other computer systems over a Communications Medium 980. Depending on the exact functionality provided, the machine may be referred to as a smart phone, a data communication machine, client, or server, as examples.

Where Application Specific Machine 900 is enabled for two-way communication, it will incorporate communication subsystem 940, including both a receiver 946 and a transmitter 944, as well as associated components such as one or more, preferably embedded or internal, antenna elements (not shown) if wireless communications are desired, and a processing module such as a digital signal processor (DSP) 942. As will be apparent to those skilled in the field of communications, the particular design of the communication subsystem 940 will be dependent upon the communications medium 980 in which the machine is intended to operate. For example, Application Specific Machine 900 may include communication subsystems 940 designed to operate within the 802.11 network, Bluetooth™ or LTE network, both those networks being examples of communications medium 980 including location services, such as GPS. Communications subsystems 940 not only ensures communications over communications medium 980, but also application specific communications 947. An application specific processor 917 may be provided, for example to process application specific data, instructions, and signals, such as for example for GPS, near field, or other application specific functions. Depending on the application, the application specific processor 917 may be provided by the DSP 942, by the communications subsystems 940, or by the processor 910, instead of by a separate unit.

Network access requirements will also vary depending upon the type of communications medium 980. For example, in some networks, Application Specific Machine 900 is registered on the network using a unique identification number associated with each machine. In other networks, however, network access is associated with a subscriber or user of Application Specific Machine 900. Some specific Application Specific Machine 900 therefore require other subsystems 927 in order to support communications subsystem 940, and some application specific Application Specific Machine 900 further require application specific subsystems 927. Local or non-network communication functions, as well as some functions (if any) such as configuration, may be available, but Application Specific Machine 900 will be unable to carry out any other functions involving communications over the communications medium 9180 unless it is provisioned. In the case of LTE, a SIM interface is normally provided and is similar to a card-slot into which a SIM card can be inserted and ejected like a persistent memory card, like an SD card. More generally, persistent Memory 920 can hold many key application specific persistent memory data or instructions 927, and other instructions 922 and data structures 925 such as identification, and subscriber related information. Although not expressly shown in the drawing, such instructions 922 and data structures 925 may be arranged in a class hierarchy so as to benefit from re-use whereby some instructions and data are at the class level of the hierarchy, and some instructions and data are at an object instance level of the hierarchy, as would be known to a person of ordinary skill in the art of object oriented programming and design.

When required network registration or activation procedures have been completed, Application Specific Machine 900 may send and receive communication signals over the communications medium 980. Signals received by receiver 946 through communications medium 980 may be subject to such common receiver functions as signal amplification, frequency down conversion, filtering, channel selection and the like, analog to digital (A/D) conversion. A/D conversion of a received signal allows more complex communication functions such as demodulation and decoding to be performed in the DSP 942. In a similar manner, signals to be transmitted are processed, including modulation and encoding for example, by DSP 942 and input to transmitter 944 for digital to analog conversion, frequency up conversion, filtering, amplification and transmission over the communication medium 980. DSP 942 not only processes communication signals, but also provides for receiver and transmitter control. For example, the gains applied to communication signals in receiver 946 and transmitter 944 may be adaptively controlled through automatic gain control algorithms implemented in DSP 944. In the example system shown in FIG. 9, application specific communications 947 are also provided. These include communication of information located in either persistent memory 920 or volatile memory 930, and in particular application specific PM Data or instructions 927 and application specific PM Data or instructions 937.

Communications medium 980 may further serve to communicate with multiple systems, including an other machine 990 and an application specific other machine 997, such as a server (not shown), GPS satellite (not shown) and other elements (not shown). For example, communications medium 980 may communicate with both cloud based systems and a web client based systems in order to accommodate various communications with various service levels. Other machine 990 and Application Specific Other machine 997 can be provided by another embodiment of Application Specific Machine 900, wherein the application specific portions are either configured to be specific to the application at the other machine 990 or the application specific other machine 997, as would be apparent by a person having ordinary skill in the art to which the other machine 990 and application specific other machine 997 pertains.

Application Specific Machine 900 preferably includes a processor 910 which controls the overall operation of the machine. Communication functions, including at least data communications, and where present, application specific communications 947, are performed through communication subsystem 940. Processor 910 also interacts with further machine subsystems such as the machine-human interface 960 including for example display 962, digitizer/buttons 964 (e.g. keyboard that can be provided with display 962 as a touch screen), speaker 965, microphone 966 and Application specific HMI 967. Processor 910 also interacts with the machine-machine interface 9150 including for example auxiliary I/O 952, serial port 955 (such as a USB port, not shown), and application specific MHI 957. Processor 910 also interacts with persistent memory 920 (such as flash memory), volatile memory (such as random access memory (RAM)) 930. A short-range communications subsystem (not shown), and any other machine subsystems generally designated as Other subsystems 970, may be provided, including an application specific subsystem 927. In some embodiments, an application specific processor 917 is provided in order to process application specific data or instructions 927, 937, to communicate application specific communications 947, or to make use of application specific subsystems 927.

Some of the subsystems shown in FIG. 9 perform communication-related functions, whereas other subsystems may provide application specific or on-machine functions. Notably, some subsystems, such as digitizer/buttons 964 and display 962, for example, may be used for both communication-related functions, such as entering a text message for transmission over a communication network, and machine-resident functions such as application specific functions.

Operating system software used by the processor 910 is preferably stored in a persistent store such as persistent memory 920 (for example flash memory), which may instead be a read-only memory (ROM) or similar storage element (not shown). Those skilled in the art will appreciate that the operating system instructions 932 and data 935, application specific data or instructions 937, or parts thereof, may be temporarily loaded into a volatile 930 memory (such as RAM). Received or transmitted communication signals may also be stored in volatile memory 930 or persistent memory 920. Further, one or more unique identifiers (not shown) are also preferably stored in read-only memory, such as persistent memory 920.

As shown, persistent memory 920 can be segregated into different areas for both computer instructions 922 and application specific PM instructions 927 as well as program data storage 925 and application specific PM data 927. These different storage types indicate that each program can allocate a portion of persistent memory 920 for their own data storage requirements. Processor 910 and when present application specific processor 917, in addition to its operating system functions, preferably enables execution of software applications on the Application Specific Machine 900. A predetermined set of applications that control basic operations, including at least data communication applications for example, will normally be installed on Application Specific Machine 900 during manufacturing. A preferred software application may be a specific application embodying aspects of the present application. Naturally, one or more memory stores would be available on the Application Specific Machine 900 to facilitate storage of application specific data items. Such specific application would preferably have the ability to send and receive data items, via the communications medium 980. In a preferred embodiment, the application specific data items are seamlessly integrated, synchronized and updated, via the communications medium 980, with the machine 910 user's corresponding data items stored or associated with an other machine 990 or an application specific other machine 997. Further applications may also be loaded onto the Application Specific Machine 900 through the communications subsystems 940, the machine-machine interface 950, or any other suitable subsystem 970, and installed by a user in the volatile memory 930 or preferably in the persistent memory 920 for execution by the processor 910. Such flexibility in application installation increases the functionality of the machine and may provide enhanced on-machine functions, communication-related functions, or both. For example, secure communication applications may enable electronic commerce functions and other such financial transactions to be performed using the Application Specific Machine 900.

In a data communication mode, a received signal such as a text message or web page download will be processed by the communication subsystem 940 and input to the processor 910, which preferably further processes the received signal for output to the machine-human interface 960, or alternatively to a machine-machine interface 950. A user of Application Specific Machine 900 may also compose data items such as messages for example, using the machine-human interface 9160, which preferably includes a digitizer/buttons 964 that may be provided as on a touch screen, in conjunction with the display 962 and possibly a machine-machine interface 950. Such composed data items may then be transmitted over a communication network through the communication subsystem 910. Although not expressly show, a camera can be used as both a machine-machine interface 950 by capturing coded images such as QR codes and barcodes, or reading and recognizing images by machine vision, as well as a human-machine interface 960 for capturing a picture of a scene or a user.

For audio/video communications, overall operation of Application Specific Machine 900 is similar, except that received signals would preferably be output to a speaker 934 and display 962, and signals for transmission would be generated by a microphone 936 and camera (not shown). Alternative voice or audio I/O subsystems, such as a voice message recording subsystem, may also be implemented on Application Specific Machine 900. Although voice or audio signal output is preferably accomplished primarily through the speaker 965, display 962 and applications specific MHI 967 may also be used to provide other related information.

Serial port 955 in FIG. 9 would normally be implemented in a smart phone-type machine as a USB port for which communication or charging functionality with a user's desktop computer, car, or charger (not shown), may be desirable. Such a port 955 would enable a user to set preferences through an external machine or software application and would extend the capabilities of Application Specific Machine 900 by providing for information or software downloads to Application Specific Machine 900 other than through a communications medium 980. The alternate path may for example be used to load an encryption key onto the machine through a direct and thus reliable and trusted connection to thereby enable secure machine communication.

Communications subsystems 940, may include a short-range communications subsystem (not shown), as a further optional component which may provide for communication between Application Specific Machine 900 and different systems or machines, which need not necessarily be similar machines. For example, the other subsystems 970 may include a low energy, near field, or other short-range associated circuits and components or a Bluetooth™ communication module to provide for communication with similarly enabled systems and machines.

The exemplary machine of FIG. 9 is meant to be illustrative and other machines with more or fewer features than the above could equally be used for the present application. For example, one or all of the components of FIG. 9 can be implemented using virtualization whereby a virtual Application Specific Machine 900, Communications medium 980, Other machine 990 or Application Specific Other Machine 997 is provided by a virtual machine. Software executed on these virtual machines is separated from the underlying hardware resources. The host machine is the actual machine on which the virtualization takes place, and the guest machine is the virtual machine. The terms host and guest differentiate between software that runs on the physical machine versus the virtual machine, respectively. The virtualization can be full virtualization wherein the instructions of the guest or virtual machine execute unmodified on the host or physical machine, partial virtualization wherein the virtual machine operates on shared hardware resources in an isolated manner, to hardware-assisted virtualization whereby hardware resources on the host machine are provided to optimize the performance of the virtual machine. Although not expressly shown in the drawing, a hypervisor program can be used to provide firmware for the guest or virtual machine on the host or physical machine. It will be thus apparent to a person having ordinary skill in the art that components of FIG. 9 can be implemented in either hardware or software, depending on the specific application. For example, while testing and developing the Application Specific Machine 900 may be provided entirely using an emulator for the machine, for example a smartphone emulator running Android™ or iOS™. When deployed, real smartphones would be used.

Each component in FIG. 9 can be implemented using any one of a number of cloud computing providers such as Microsoft's Azure™, Amazon's Web Service ™, Google's Cloud Computing, or an OpenStack based provider or the like, by way of example only. Thus, as will be apparent to a person having ordinary skill in the relevant field of art, depending on whether the environment in which operate the components of FIG. 9, the Communications medium 980 can be the Internet, an IP based medium such as a virtual, wired, or wireless network, an interconnect back plane on a host machine serving as a back bone between virtual machines and/or other real machines, or a combination thereof. For example, in the case of the communications subsystems 940, the Transmitter 944, Receiver 946 and DSP 942 may be unnecessary if the application specific machine is provided as a virtual machine. Likewise, when the application is a server provided as a virtual machine, the machine-human interface 960 and machine-machine interface 950 may be provided by re-use of the resources of the corresponding host machine, if needed at all.

Data can be represented with a bit, a nibble, a byte, a 16 bit, a 32 bit and a 64 bit values. A bit is a binary data structure that can take on one of two values, typically represented by a 1 or a 0. In alternative physical realizations of a bit, the bit can be stored in read only memory, random access memory, storage medium, electromagnetic signals. Bits are typically realized in large multiples to represent vast amounts of data. A grouping four bits is called a nibble. Two nibbles form a byte. The byte is of particular importance as most data structures that are larger groupings of bits than one byte are typically made up of multiples of bytes. Two bytes form a 16 BIT structure. Two 16 BIT structures form a 32 BIT structure. Two 32 BIT structures form a 64 BIT structure. An exemplary collection of data types that uses the data representations follows. Data types are abstractions that represent application specific data using either primitive or non-primitive constructs. The most fundamental primitive data type is a Boolean data type, which can be represented using a single bit with the boolean data structure, or more frequently using a boolean data structure that uses a single byte. More complex data types of the primitive data type is a Numeric data type. Three broad examples of the Numeric data type are the Integer data type, the Floating Point data type, and the Character data types. A byte, a short, an int, and a long are examples of Integer Numeric Primitive Data Types using a BYTE, 16 BIT, 16 BIT, 32 BIT and 64 BIT representation respectively. A float and a double are examples of Floating Point Numeric Primitive Data Types and are represented using 32 BIT and 64 BIT representations respectively. Depending on the application, Integer and Floating Point Data Types can be interpreted as signed or unsigned values. In contrast, Character data types represent alphanumeric information. A char8 is represented using a single byte, while a char is represented using a 16 BIT value, such as for example in ASCII or Unicode respectively. Having defined some example Primitive Data Types, it is possible to build up Non-Primitive Data Types by combining Primitive ones, such as for example a String which is a collection of consecutive Character, an Array which is a collection of Primitive, and more generally, a Data Structure which can be a collection of one or more Data Types. Of particular interest are instances of Data Structure that can represent Instructions, Class, and Object. Instructions are data structures that are processed by a given processor to implement a specific method or process. Some Instructions work effectively with corresponding data and are packaged into templates that can be reused, such as code libraries, or as is shown in the drawing in a Class which is a collection of attributes including Data Types and methods including Instructions. A Class can be arranged relative to other Classes in order to provide a Class hierarchy, a linked Data Structure whereby one specific Class is related to one or more other Classes by either "is a" or "has a" relationships. Furthermore, instances of a Class can be instantiated into instances of an Object of that given Class at run time to provide a runtime context for attributes. Thus, it is possible to show the relationship between various Object of specific Class using entity relationship diagrams where each Object or Class is related to others using "is a" and "has a" relationships, and where attributes represent Data Types, and methods represent Instructions. Typically, attributes are shown using a variable name and methods are shown using a function name preceded by a set of parentheses "( )". Thus, when illustrated in the present drawings, it will be understood that a person of ordinary skill in the art will know how to convert from these conventions into the Data Types and Instructions with are ultimately processed by computing systems.

Having described the environment in which the specific techniques of the present application can operate, application specific aspects will be further described by way of example only. The identification label of the air sampling housing has been described as containing a unique identifier, or an ID. This was illustrated with a bar code that can be read using a camera of the machine of FIG. 9. The identifier could also be typed into the machine, scanned as a QR code, or identified using bluetooth low energy, or many manner of other such techniques. Once the identifier is within the environment of the machine, software configured on the machine can create, read, update, and delete a data record containing the identifier, and communicate with other machines to provide a system for collecting information that is presently missing regarding aircraft air quality. The data record can include or be a part of a log of events. The data record can include or be related to a protocol for standardized sampling air, e.g. showing that a Canadian or US standard was complied with, dependant on jurisdiction and regulations, etc. Any other information, such as weather, altitude, that can be helpful can be included in the data record, such as the registration number, e.g. N number (in USA) and C number (in CA). Two data records can be correlated for example to compare the timing and location of air samples at two or more source or sinks to identify what zone that is the source of contaminants. Although sampling has been illustrated at a gasper, it can be accomplished at the cockpit or lavatory or over seat, in the cargo compartment, etc. In a preferred embodiment, the machine can be used to control any number of sampling devices that range from a simple cassette with media to a real time sensor that detects the presence of oil from bleed air using a 120-140 nm UV lamp (variable frequency) and a sensor to detect fluorescence in the 300-400 nm range which may be typical of oil fume events. Thus, the machine could detect a fume event, capture an air sample, and take other preventative actions, such as for example closing off the bleed air system from where the source of the contaminant has been determined to come from. For example, by placing a sampling device at a ceiling vent of a cabin, and another at the outflow valve of the cargo compartment, a machine can help isolate the source of the contaminant. Likewise, in a semi automatic configuration, flight attendants could trigger the sampling of cabin air during different phases of a flight, or when a fume event is suspected, or a passenger or crew member presents symptoms, for example using a bluetooth or other short range trigger on a smart watch, or cell phone, to cause an air sample to be taken. In so doing, since the machines are capable of communicating, an Internet Of Things (IoT) sensor network is created and the resulting data records can be used by the relevant authorities, airline carriers, cabin crews, flight attendants, technicians, air duct cleaning personnel, and the general public to monitor and improve aircraft cabin air by collecting information into a compiled database that can be mined to pre-populate forms for reporting incidents, extrapolate information from data records, suggest maintenance and cleaning of air ducts, air filters, and engines or systems that are related to bleed air and other contaminants. In particular, the use of data records linking sampling devices to events, aircraft, maintenance records, and cleaning techniques ensures that overall air quality will improve in aircrafts regardless of the actual sampling device and cleaning techniques being first used: the doctrine of sound prediction can be used to prove that the method results in an evidence based and driven continuous improvement of air quality in cabins. The following figures illustrate one embodiment of the proposed method.

Figure 10:
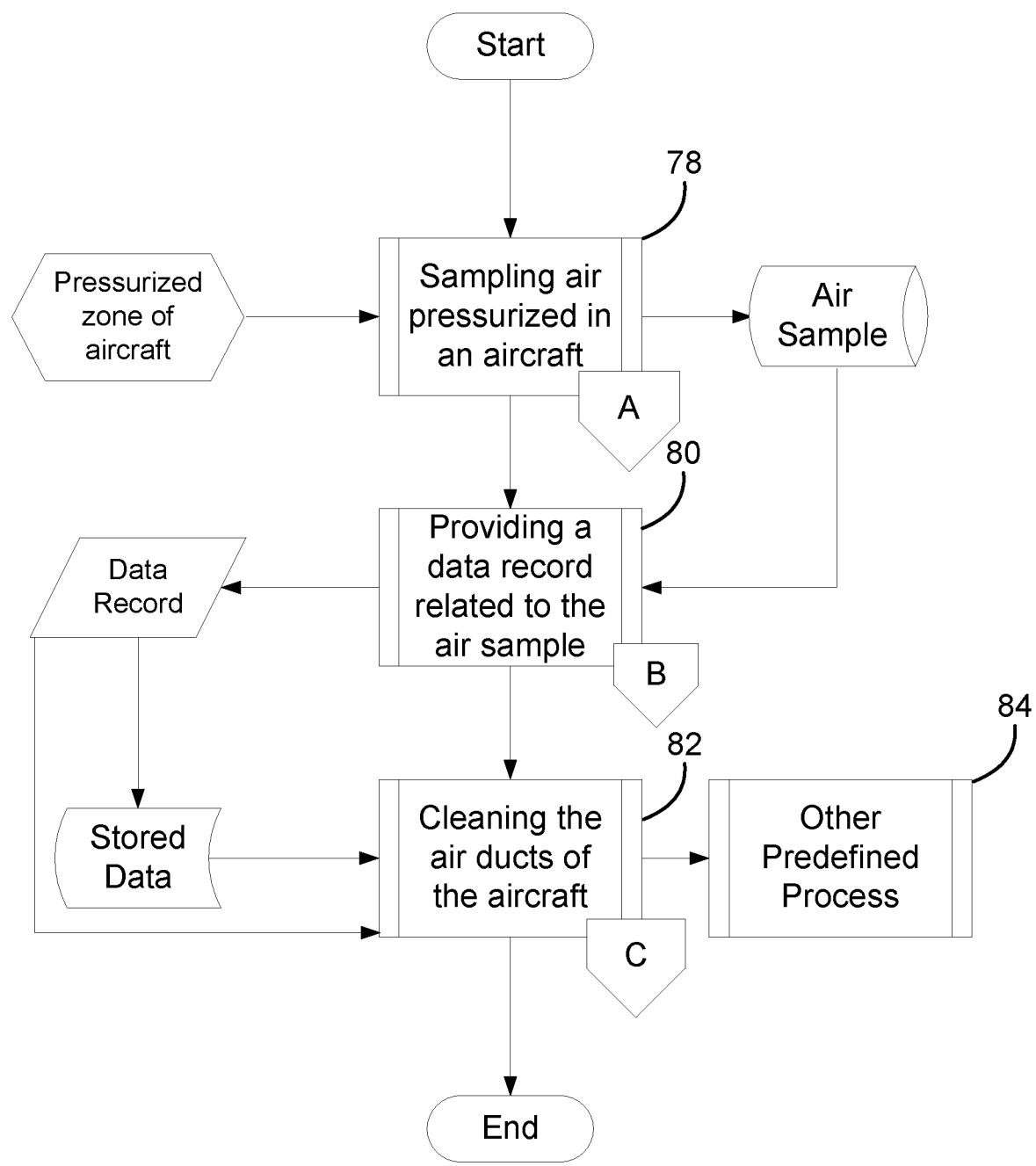
FIG. 10 is a flow chart illustrating steps of a method of air quality improvement for pressurized aircraft.

FIG. 10 is a flow chart illustrating steps of a method of air quality improvement for pressurized aircraft. The flowchart shows a step of sampling 78 air pressurized in an aircraft whereby a pressurized zone of an aircraft is sampled to produce an air sample, followed by a step of providing 80 a data record related to the air sample wherein information regarding the air sample are included in the provided data record, and a step of cleaning 82 the air ducts of an aircraft using stored data and/or the data record provided that is related to the sampling step. Once the air ducts of an aircraft have been cleaned, other predefined process 84 can take place such as for example storing any information including maps of air ducts that were created during the cleaning step, before and after information, etc.

Figure 11:
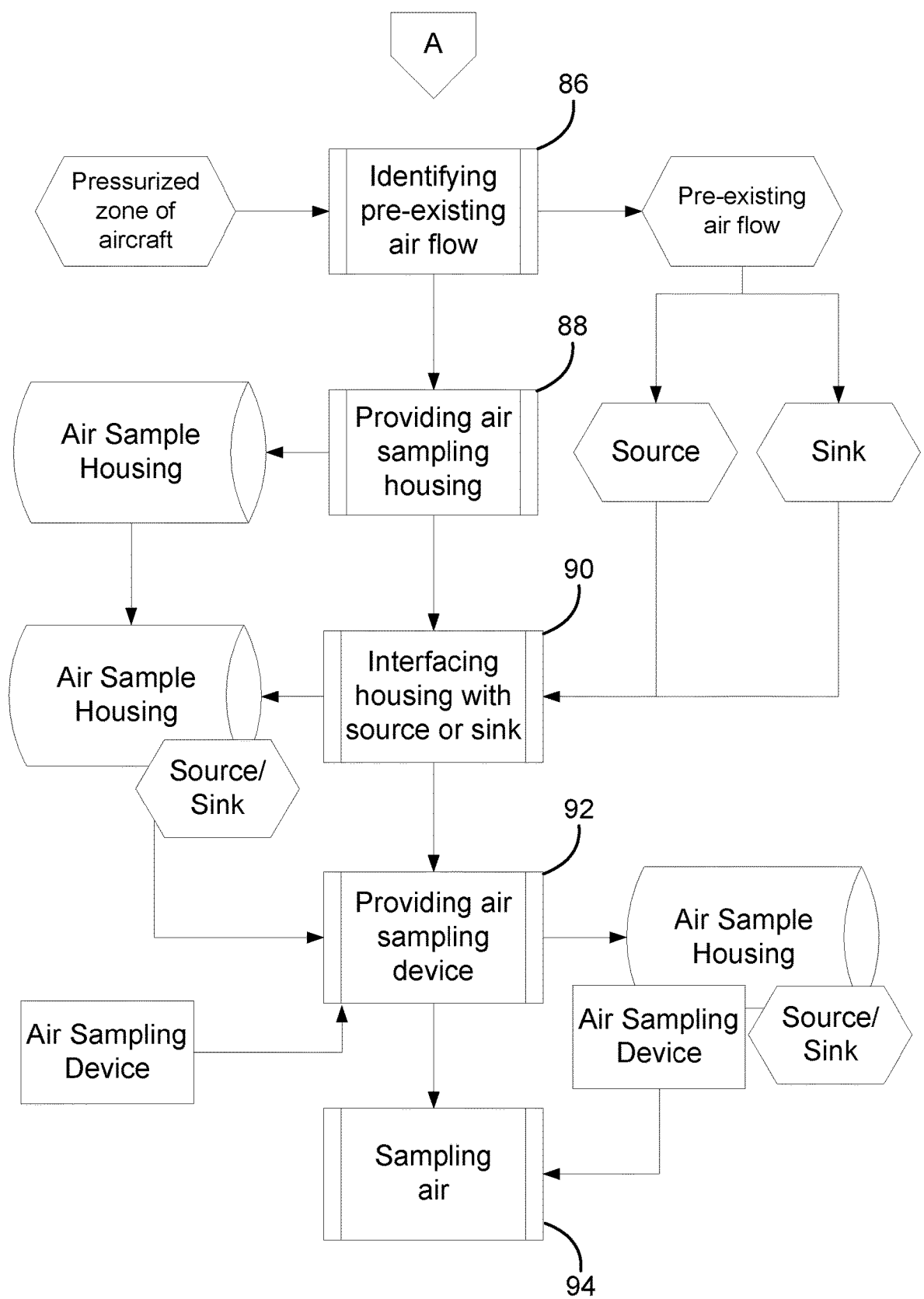
FIG. 11 is a flow chart illustrating acts for the sampling step of FIG. 10.

FIG. 11 is a flow chart illustrating acts for the sampling step of FIG. 10. The flowchart shows an act of identifying 86 pre-existing air flow 50 whereby the pressurized zones of an aircraft are considered to identify one or more pre-existing air flow 50 such that no electricity or pump is required to sample air, an act of providing 88 an air sampling housing 48 which would be selected considering the kind of sampling that would be required given the aircraft and the pre-existing air flow 50 identified, an act of interfacing 90 the housing with source or sink whereat the provided air sampling housing 48 is put into fluid communication with the source or sink, an act of providing 92 an air sampling device 30 which cooperates with the air sampling housing 48 to be in fluid communication with the source or sink of the pre-existing air flow 50, and an act of sampling 94 air using the air sampling device 30 provided with the air sampling housing 48 interfaced with the source or sink of the pre-existing air flow 50.

Figure 12:
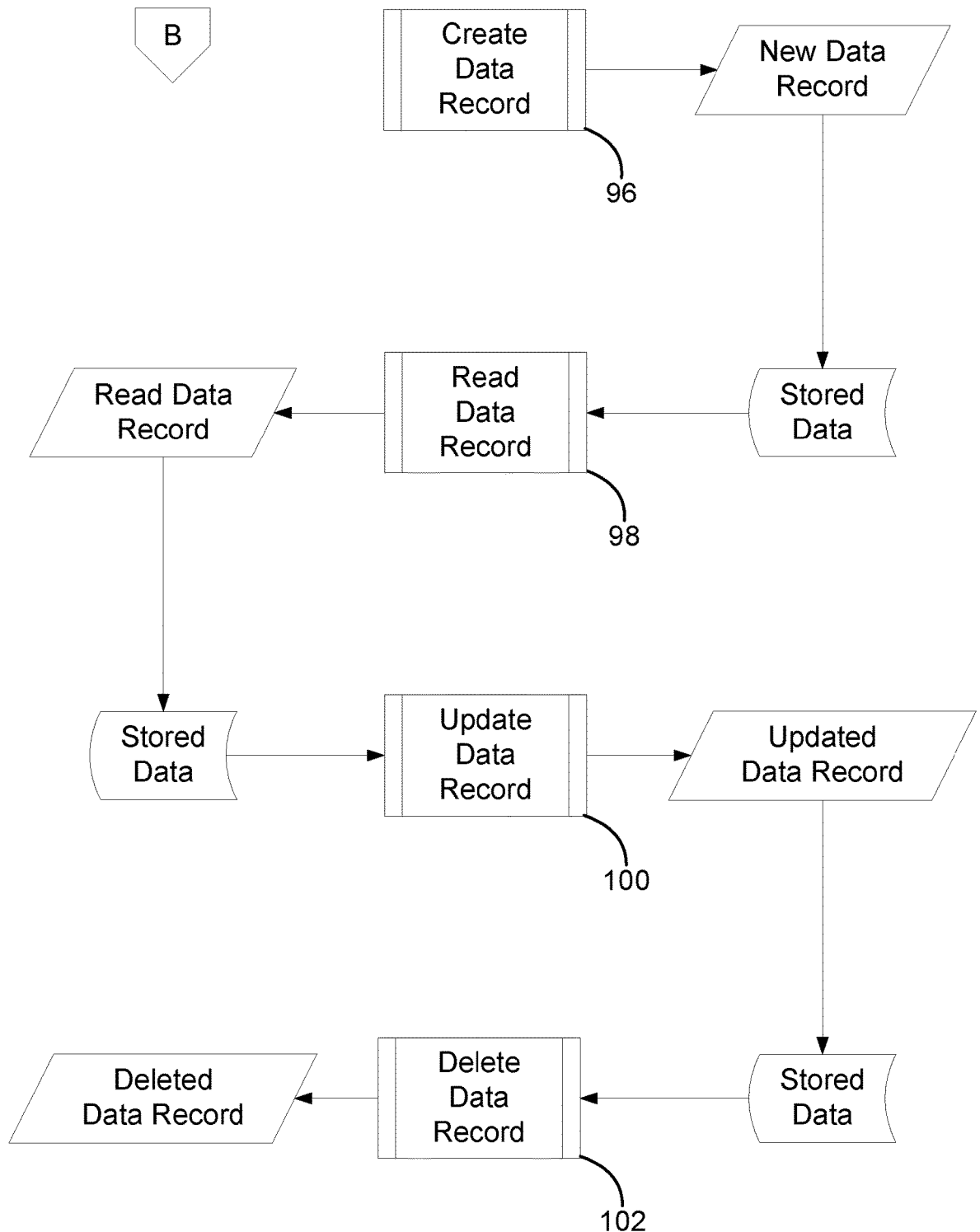
FIG. 12 is a flow chart illustrating the typical life cycle of a data record.

FIG. 12 is a flow chart illustrating the typical life cycle of a data record. The flow chart shows a create data record act 96 whereby a new data record is created, such as for example, when an air sample is taken, or when a request that an air sample be taken is made, afterwhich the data record is stored; a read data record act 98 whereby stored data is read to obtain a read data record such as for example to check the request that an air sample be taken to determine the location of a pre-existing data source to use and in what pressurized zone it is located, an update data record act 100 whereat a given data record is updated to include information that may be required in subsequent work on the aircraft such as work orders for maintaining or cleaning the air ducts, and a delete data record act 102 whereby a data record is removed from stored data and access to information in the data record is no longer available.

Figure 13:
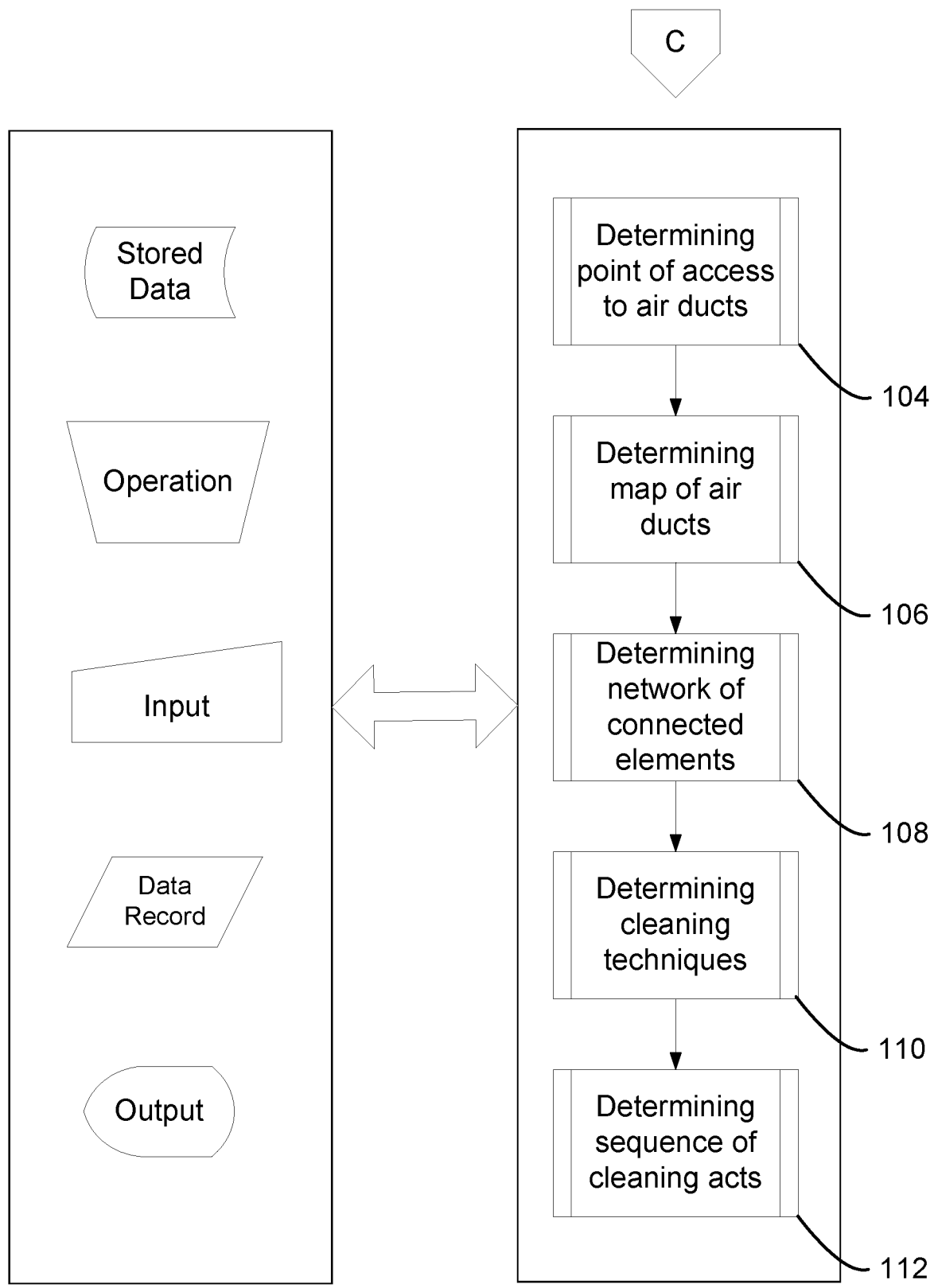
FIG. 13 is a flow chart illustrating acts for the cleaning step of FIG. 10.

FIG. 13 is a flow chart illustrating acts for the cleaning step of FIG. 10. The flowchart illustrates the act of determining 104 a point of access to air ducts whereby if the aircraft is known, reading of a data record in stored data about the aircraft, or a data record for an aircraft of similar make and model, can help determine the point of access, or a site survey of the aircraft with qualified personnel can be made in the case of an aircraft whose make or model has never had its air ducts cleaned before. At the act of determining 106 a map of air ducts, if the aircraft, make, or model were not known to have had their air ducts cleaned before, no stored data exists therefore a mapping of the air ducts is performed using, for example the device of FIGS. 7-8, the result of which would be updated in the data record related to the sample for the aircraft.

Advantageously, the techniques for air quality improvement for pressurized aircraft disclosed herein can enable the relevant aviation administration to develop a standardized form for flight attendants, pilots, and aircraft maintenance technicians to report incidents of smoke or fumes on board an aircraft operated by a commercial carrier. The content of the form can either be stored in a data record related to the incident if it an air sample was taken during the incident, or a link to the form can be updated in the data record once the form is filled in. The techniques can establish a system for reporting incidents of smoke or fumes on board aircraft that allows pilots, flight attendants, and aircraft technicians to submit the above mentioned form to the relevant aviation administration, as well as to receive a copy of the form and/or data record for their own records. The established system allows pilots, flight attendants, aircraft maintenance technicians, the collective bargaining representative of employees of the carrier, and commercial air carriers to search the reported incidents database compiled by the relevant aviation authority for the purpose of reviewing and monitoring incidents contained in the database and assisting with investigations. The techniques taught herein can enable any form content to be stored in the data record related to an air sample, such as for example, one or more pieces of information for reporting an incident of smoke or fumes on board an aircraft, including sections for the following information, if available at the time of the report, or to be updated in the data record at a subsequent time: identification of the flight, the type of aircraft, the registration number of the aircraft, and the individual reporting the incident; information about the smoke or fire, if relevant, including a description of the nature and apparent source of the smoke or fire; information about the fumes, including a description of the type, apparent source, smell, and visual consistency (if any) of the smoke or fumes; information about the location of the smoke or fumes; information about the engine manufacturer, engine type, the engine serial number, and the age of the engine; information about the phase of flight during which smoke or fumes where present, and if the incident happened while the aircraft was on the ground, the location of the aircraft on the ground, the location of the aircraft at the airport at the time of the incident; other observations about the smoke or fumes; a description of symptoms reported by crew members and passengers; information with respect to whether crew members or passengers used, needed, or were administered supplemental or emergency oxygen; information regarding any effects on the operation of the flight; and information about maintenance work conducted on the aircraft following the incident. What is more, the relevant administrator of the relevant aviation administration is enabled to compile, make available to the public statistics regarding the information obtained from the forms related to the data records. The information may be published on a website that includes aggregate data and a searchable database for events reported to the relevant administration, including one or more of the following for each event: date; tail number; air carrier; phase of flight; location of fumes; description of fumes; aircraft type; engine type; oil type; deidentified narrative; cause or maintenance information of cause is not known; other criteria considered appropriate. The information can be redacted of personally identifiable information before it is made available to the public. Should the relevant aviation administration fail to develop the standardized form and system, advantageously a commercial party is enabled by the present disclosure to do so.

Since other modifications and changes varied to fit particular operating requirements and environments will be apparent to those skilled in the art, the disclosure is not considered limited to the example chosen for purposes of disclosure, and covers all changes and modifications which do not constitute departures from the true spirit and scope of this disclosure.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The above-described embodiments of the present disclosure are intended to be examples only. Those of skill in the art may effect alterations, modifications and variations to the particular embodiments without departing from the scope of the disclosure, which is set forth in the claims.

What is claimed is:

1. A method of improving air quality in an aircraft comprising the steps of:
    sampling air of a pressurized zone of an aircraft to produce a pressurized air sample;
    providing a data record that is related to the pressurized air sample; and
    cleaning the cabin air ducts of the aircraft while using the data record;
    wherein the sampling step comprises the acts of:
        identifying a pre-existing pressurized air flow in a pressurized zone of an aircraft suitable for sampling pressurized air;
        providing an air sampling housing having an inlet port, an outlet port, and a sampling region therebetween, the sampling region in fluid communicating with the inlet port and the outlet port;
        interfacing the air sampling housing with either a pre-existing source or a pre-existing sink of the pre-existing pressurized air flow so a portion of the pre-existing pressurized air flow enters the inlet port, flows through the sampling region, and exits the outlet port; and
        providing an air sampling device in the sampling region of the air sampling housing so that a portion of the pre-existing pressurized air flow that flows through the sampling region can be sampled by the sampling device without substantially blocking the pre-existing pressurized air flow;
    further wherein the act of sampling the cabin air includes the act of using the sampling device thereby providing the pressurized air sample and wherein the act of providing the data record related to the pressurized air sample is related to the act of using the sampling device.

2. The method according to claim 1, wherein the act of identifying a pre-existing pressurized air flow includes the act of identifying a pre-existing vent in the aircraft as the pre-existing source of the pre-existing pressurized air flow entering the pressurized zone and wherein the act of interfacing the air sampling housing includes the act of attaching the inlet port of the air sampling housing to the pre-existing source.

3. The method according to claim 1, wherein the act of identifying a pre-existing pressurized air flow in the pressurized zone of the aircraft includes the act of identifying a pre-existing vent in the aircraft as the pre-existing sink of the pre-existing pressurized air flow exiting the pressurized zone and wherein the act of interfacing the air sampling housing includes the act of attaching the outlet port of the air sampling housing to the pre-existing sink.

4. The method according claim 1, further comprising the act of providing at least one opening in the air sampling housing for fluid communication with the pressurized zone so that a new air flow can reach the sampling region via the at least one opening.

5. The method according to claim 1, wherein the data record includes at least one type of information selected from the group consisting of pressurized air flow information, temperature information, pressure information, humidity information, flight information, identification information, time or date information, a flight number, an airport code, coordinate information and speed information.

6. The method according to claim 1, further including the act of performing an analysis of a quality of the cabin air sample.

7. The method according to claim 6, wherein the data record includes air quality information related to the analysis of the quality of the air sample.

8. The method according to claim 7, wherein the air quality information includes information about a contaminant.

9. The method according to claim 8, wherein the information about the contaminant includes information about pathogens selected from the group consisting of bacteria, fungi and viruses.

10. The method according to claim 8, wherein the information about the contaminant includes information about a contaminant type selected from the group consisting of dust, fibres, odours, ozone, contaminants related to a fume event, and volatile or semi-volatile organic compounds (VOCs and SVOCs).

11. The method according to claim 1, further comprising the act of using the data record to determine that the aircraft is due to have a cabin air filter cleaned or serviced or to have its cabin air ducts cleaned or serviced.

12. The method according to claim 1, wherein cleaning the cabin air ducts further comprises the acts of:
  determining a point of access to the cabin air ducts of the aircraft ;
  determining a map of the cabin air ducts of the aircraft;
  determining a network of connected air duct elements of the map of cabin air ducts;
  determining a collection of cleaning techniques suitable for cleaning the respective air duct elements of the determined network of connected air duct elements of the map of cabin air ducts; and
  determining a sequence of cleaning acts, each cleaning act including the act of applying a select cleaning technique selected from the determined collection of cleaning techniques suitable for cleaning a respective select element selected from the determined network of connected elements of the map of cabin air ducts.

13. The method according to claim 12, further comprising the act of relating at least one of the results of the determining acts to the air sample via the data record.

14. The method according to claim 13, further comprising the act of applying the sequence of cleaning acts to clean the cabin air ducts of the aircraft.

15. The method according to claim 1, further comprising at least one act type selected from the group consisting of the act of creating the data record, the act of reading the data record, the act of updating the data record, the act of deleting the data record the act of including the data record as part of a set of data records, and the act of including the data record as part of the log book of the aircraft.

16. The method according to claim 1, further comprising the act of including the data record as part of a set of data records and the act of extrapolating a second data record from the set of data records.

* * * * *